(12) United States Patent
Balasubramanian et al.

(10) Patent No.: US 9,313,720 B2
(45) Date of Patent: Apr. 12, 2016

(54) POWER EFFICIENT SMALL BASE STATION SCANNING AND ACQUISITION

(75) Inventors: Srinivasan Balasubramanian, San Diego, CA (US); Manoj M. Deshpande, San Diego, CA (US); Young C. Yoon, San Diego, CA (US); Jen Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 872 days.

(21) Appl. No.: 12/409,368

(22) Filed: Mar. 23, 2009

(65) Prior Publication Data
US 2009/0247170 A1 Oct. 1, 2009

Related U.S. Application Data

(60) Provisional application No. 61/040,095, filed on Mar. 27, 2008, provisional application No. 61/041,142, filed on Mar. 31, 2008, provisional application No. 61/081,664, filed on Jul. 17, 2008.

(51) Int. Cl.
*H04W 4/00* (2009.01)
*H04W 48/16* (2009.01)
(Continued)

(52) U.S. Cl.
CPC .......... *H04W 48/16* (2013.01); *H04W 52/0229* (2013.01); *H04W 84/045* (2013.01); *Y02B 60/50* (2013.01)

(58) Field of Classification Search
CPC ... H04W 48/16; H04W 84/045; H04W 36/08; H04W 88/08; H04W 36/0088; H04W 24/10; H04W 36/14; H04W 28/08; H04W 36/18; H04W 36/30; H04W 36/32; H04W 84/12; H04W 92/02; H04W 92/20; H04W 48/18

USPC ............ 455/522, 512, 13.4, 41.2, 443, 435.1, 455/446, 550.1, 561, 515, 552.1, 444, 455/435.3, 436, 456.2
See application file for complete search history.

(56) References Cited

U.S. PATENT DOCUMENTS 5,794,146 A 8/1998 Sevcik et al.
6,249,678 B1 6/2001 Mathai et al.
(Continued)

FOREIGN PATENT DOCUMENTS

CN 1613197 A 5/2005
EP 1441469 A2 7/2004
(Continued)

OTHER PUBLICATIONS

Alcatel-Lucent et al: "HNB/HeNB—Closed Subscriber Group (CSG) requirements for UTRA and E-UTRA" 3GPP Draft; SP-080186, 3rd Generation Partnership Project (3GPP), Mobile Competence Centre : 650, Route des Lucioles ; F-06921 Sophia-Antipolis Cedex ; France, vol. RAN WG2, no. Shenzhen, China; 20080331, Mar. 11, 2008, XP050139696 the whole document.
(Continued)

*Primary Examiner* — Kwasi Karikari
(74) *Attorney, Agent, or Firm* — Dalei Dong

(57) ABSTRACT

Cellular network may introduce a large number of limited access/limited range ("small") base stations deployed by end-users such as home base nodes (HNBs) or Femtocells that provide access to access terminals (ATs) or user equipment (UE) to a core network. A selective discovery approach enables UE to discover and to use a small base station without wasting power to discover an alien base station or to search when not within range of any open small base station. Discovery can entail location-dependent determination (e.g., macro base station triangulation, global positioning system, local broadcast channel, etc.) of being within range of an open femtocell whose identity was manually learned, accessed via a distributed neighbor list, etc. The UE can advantageously tolerate small changes in location without having to relearn the identity of the femtocell. The type of access afforded is advantageously communicated to end user via a display indicator.

61 Claims, 13 Drawing Sheets

(51) Int. Cl.
*H04W 52/02* (2009.01)
*H04W 84/04* (2009.01)

(56) References Cited

U.S. PATENT DOCUMENTS

| | | | |
|---|---|---|---|
| 7,089,004 B2 | 8/2006 | Jeong et al. | |
| 2002/0137513 A1 | 9/2002 | Aihara et al. | |
| 2003/0091009 A1 | 5/2003 | Halivaara | |
| 2003/0134658 A1 | 7/2003 | Kaminski et al. | |
| 2004/0248568 A1 | 12/2004 | Lucidarme | |
| 2005/0037778 A1* | 2/2005 | Patel | 455/456.3 |
| 2005/0153695 A1 | 7/2005 | Cho | |
| 2006/0084443 A1 | 4/2006 | Yeo et al. | |
| 2006/0092881 A1 | 5/2006 | Laroia et al. | |
| 2006/0148486 A1 | 7/2006 | Kim et al. | |
| 2006/0246895 A1 | 11/2006 | Ryu | |
| 2007/0129092 A1* | 6/2007 | Doradla et al. | 455/515 |
| 2007/0135122 A1 | 6/2007 | Dillon et al. | |
| 2007/0155421 A1 | 7/2007 | Alberth et al. | |
| 2008/0049702 A1 | 2/2008 | Meylan et al. | |
| 2008/0076412 A1 | 3/2008 | Khetawat et al. | |
| 2008/0096580 A1* | 4/2008 | Montemurro | 455/456.1 |
| 2008/0144580 A1 | 6/2008 | Su et al. | |
| 2008/0146231 A1 | 6/2008 | Huang et al. | |
| 2008/0220784 A1 | 9/2008 | Somasundaram et al. | |
| 2008/0225744 A1 | 9/2008 | DiGirolamo et al. | |
| 2008/0242305 A1* | 10/2008 | Kahlert et al. | 455/440 |
| 2008/0293419 A1 | 11/2008 | Somasundaram et al. | |
| 2008/0305801 A1* | 12/2008 | Burgess et al. | 455/444 |
| 2009/0022068 A1* | 1/2009 | Iyer et al. | 370/254 |
| 2009/0047958 A1 | 2/2009 | Rimhagen et al. | |
| 2009/0047968 A1* | 2/2009 | Gunnarsson et al. | 455/446 |
| 2009/0052395 A1 | 2/2009 | Bao et al. | |
| 2009/0061892 A1* | 3/2009 | Lee et al. | 455/456.1 |
| 2009/0068969 A1 | 3/2009 | Lindoff et al. | |
| 2009/0092096 A1* | 4/2009 | Czaja et al. | 370/331 |
| 2009/0117891 A1* | 5/2009 | Chou | 455/423 |
| 2009/0164547 A1* | 6/2009 | Ch'ng et al. | 709/201 |
| 2009/0257390 A1 | 10/2009 | Ji et al. | |
| 2009/0274123 A1 | 11/2009 | Chang et al. | |
| 2010/0014429 A1 | 1/2010 | Kim et al. | |
| 2010/0035601 A1 | 2/2010 | Chen et al. | |
| 2010/0240368 A1 | 9/2010 | Fox et al. | |
| 2010/0285793 A1 | 11/2010 | Yoon et al. | |

FOREIGN PATENT DOCUMENTS

| | | |
|---|---|---|
| GB | 2358550 A | 7/2001 |
| JP | 2001169339 A | 6/2001 |
| JP | 2006041955 A | 2/2006 |
| JP | 2006518975 A | 8/2006 |
| JP | 2007251884 A | 9/2007 |
| RU | 2003133315 A | 6/2005 |
| RU | 2280329 C1 | 7/2006 |
| TW | 200833139 A | 8/2008 |
| WO | WO2004077753 A2 | 9/2004 |
| WO | WO2005106523 | 11/2005 |
| WO | WO2006100653 | 9/2006 |
| WO | 2007103975 | 9/2007 |
| WO | 2008025003 | 2/2008 |
| WO | WO2008030956 | 3/2008 |

OTHER PUBLICATIONS

International Search Report and Written Opinion—PCT/US2009/038458, International Search Authority—European Patent Office—Jul. 22, 2009.

Taiwan Search Report—TW098109995—TIPO—Feb. 19, 2014.

3GPP ;3rd Generation Partnership Project: Technical Specification Group Radio Access Network, User Equipment (UE) Procedures idle module procedures for cell reselection in connected mode., 3GPP TS 25.304 V8.5.0,(Mar. 2009).

Nokia Siemens Networks., et al.,"E-UTRA Measurements and Cell Reselection Considerations" 3GPP TSG-RAN WG2 Meeting #58bis, vol. R2-072386, R2-071727, No. 58BIS, Jun. 25, 2007, pp. 1-5, XP002500401.

Qualcomm Europe, "Preferred HNB Search" 3GPP Draft; R2-084346 Preferred HNB Search, 3rd Generation Partnership Project (3GPP), Mobile Comperence Centre: 650, Route Des Lucioles: F-06921, Sophia-Antipolis Cedex; France, no. Jeju; 20080812, Aug. 12, 2008, XP050319422.

"Universal Mobile Telecommunications System (UMTS); User Equipment (UE) and procedures in idle mode and procedures for cell reselection in connected mode (3GPP TS 25.304 version 7.3.0 Release 7); ETSI TS 125 304" ETSI Standards, Lis, Sophia Antipolis Cedex, France, vol . 3-R2, No. V7.3.0, Oct. 1, 2007, XP014039982 ISSN: 0000-0001.

\* cited by examiner

POWER EFFICIENT SMALL BASE STATION SCANNING AND ACQUISITION

CLAIM OF PRIORITY UNDER 35 U.S.C. §119

The present Application for Patent claims priority to Provisional Application No. 61/040,095 entitled "FEMTOCELL SYSTEM SELECTION USING PREFERRED USER ZONE LIST (PUZL)" filed Mar. 27, 2008, assigned to the assignee hereof and hereby expressly incorporated by reference herein in its entirety.

The present Application for Patent claims priority to Provisional Application No. 61/041,142 entitled "FEMTOCELL SYSTEM SELECTION USING A PREFERRED USER ZONE LIST (PUZL)" filed Mar. 31, 2008, assigned to the assignee hereof and hereby expressly incorporated by reference herein in its entirety.

The present Application for Patent claims priority to Provisional Application No. 61/081,664 entitled "FEMTOCELL SYSTEM SELECTION USING A PREFERRED USER ZONE LIST (PUZL)" filed Jul. 17, 2008, assigned to the assignee hereof and hereby expressly incorporated by reference herein in its entirety.

FIELD OF INVENTION

The exemplary and non-limiting aspects described herein relate generally to wireless communications systems, methods, computer program products and devices, and more specifically to techniques for power efficient techniques and components for discovering a limited range, limited access base station such as a femtocell.

BACKGROUND

Typical radio access cellular networks operate by way of various radio transmission devices, or base stations. These base stations provide wireless access to wireless mobile devices, such as cellular phones, to a core network of a cellular service provider. The base stations along with various data routing and control mechanisms (e.g., base station controllers, core and edge routers, and so on) facilitate remote communication for the mobile devices. As communication service providers expand base station coverage, more land areas can be covered by the radio access network. However, some areas can be difficult to provide reliable radio coverage, for various reasons such as population, high mobile traffic, interference with other transmitters, or materials that absorb base station transmission (e.g., dense, concrete and steel buildings, underground facilities, and the like).

Indoor cellular reception in particular has issues such as high interference, especially in higher floors subject to significant pilot signal noise pollution. Some venues have high capacity for people within a small area (e.g., shopping mall, airport terminal). These high density communication venues thus strain available capacity. It can be difficult to provide seamless integration of indoor cells with outdoor cells, not only managing interference but also in association, neighbor lists and handover procedures.

One solution to provide mobile communication support to areas where radio access is difficult, is a 'personal' base station, or femto Base Station (BS) (also termed, e.g., a home Node B or Femtocell). A BS can be a relatively small range device (compared with standard radio network base stations, such as a Node-B) that facilitates wireless communication over a licensed cellular radio band (as opposed to an unlicensed band, utilized by wireless local area network routers).

In an exemplary aspect, the BS can be of any size to serve a large coverage area and amount of user equipment (e.g., cellular devices, mobile station, access terminals, handsets, etc.) within the coverage area. The BS can maintain a wireless link with cellular devices over such a radio band, in a similar manner as a Node-B base station. Consequently, a BS can provide small range cellular coverage for an area that does not receive a good signal from a radio access base station. Often, an individual consumer might utilize a BS in their home, an apartment building, an office building, and so on, for personal cellular access. In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femtocells. Typically, such miniature base stations are connected to the Internet and the mobile operator's network via DSL router, IP communication or cable modem.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with finding a preferred base station while enhancing power efficiency of user equipment (e.g., cellular devices, mobile station, access terminals, handsets, etc.), in particular, by scanning for a small base station, such as a femto system, when reasonably able to scan and acquire the small base station. Moreover, service loops are detected and broken so that a mobile station does not camp on inaccessible alien femto cell or camp on a less preferred system. For geographic-based proximity determinations, tolerance is provided to the scanning device to find a femto system that is slightly moved, changing its automatic geographic location reporting. Further, the user is given an indication to the type of system access that is being provided so that an appropriate amount of usage is undertaken.

In one aspect, a method is provided for discovering and acquiring a small base station by accessing stored access information for a small base station, determining proximity to the small base station as a trigger condition to scanning and acquiring, and scanning and acquiring the small base station.

In another aspect, at least one processor is provided for discovering and acquiring a small base station. A first module accesses stored access information for a small base station. A second module determines proximity to the small base station as a trigger condition to scanning and acquiring. A third module scans and acquires the small base station.

In an additional aspect, a computer program product is provided for discovering and acquiring a small base station. A computer-readable storage medium comprises a first set of codes for causing a computer to access stored access information for a small base station. A second set of codes causes the computer to determine proximity to the small base station as a trigger condition to scanning and acquiring. A third set of codes causes the computer to scan and acquire the small base station.

In another additional aspect, an apparatus is provided for discovering and acquiring a small base station. Means are provided for accessing stored access information for a small base station. Means are provided for determining proximity to the small base station as a trigger condition to scanning and acquiring. Means are provided for scanning and acquiring the small base station.

In a further aspect, an apparatus is provided for discovering and acquiring a small base station. A computing platform accesses stored access information for a small base station and determines proximity to the small base station as a trigger condition to scanning and acquiring. A receiver scans and acquires the small base station.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
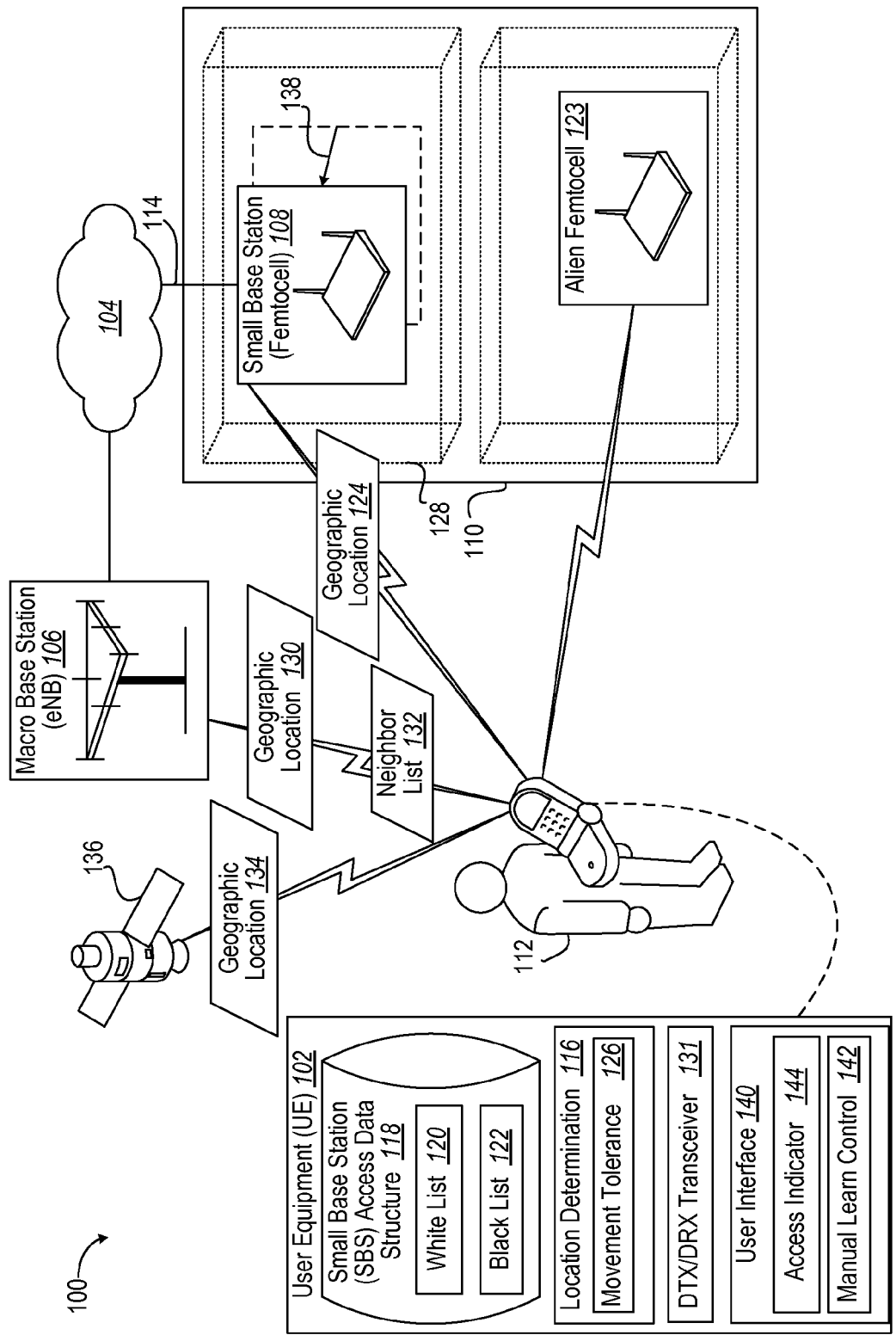
FIG. 1 illustrates a block diagram of a communication system having a mobile station or user equipment for scanning and acquiring a small base station.

A cellular network may introduce a large number of limited access/limited range ("small") base stations deployed by end-users such as home base nodes (HNBs) or Femtocells that provide access to access terminals (ATs) or user equipment (UE) to a core network. Application can further be to pico cells or any hierarchical cell structure. A selective discovery approach enables UE to discover and to use a small base station without wasting power to discover an alien base station or to search when not within range of any open small base station. For instance, an alien base station can comprise a femto cell for which the UE (e.g., cellular devices, mobile station, access terminals, handsets, etc.) is provisioned to know is not accessible or for which attempts to scan and acquire access (e.g., register) are unsuccessful for lack of proper authentication information. In some instances, a restricted base station is equivalent to an alien base station. The restricted or alien base station can in some instances provide limited access, for example accepting a call to a public safety access point (PSAP) (e.g., 911 emergency calls). In another instance, the alien or restricted base station will not provide open access (e.g., unlimited access based upon authentication information possessed by the UE); however, further steps can be employed to lift the restriction, perhaps at a usage rate (e.g., entering a credit card or otherwise acquiescing to usage billing). By virtue of this innovation, in one aspect provisioned information can be used to perform active call hand-ins. A device provisioned with small base station information in a database while in an active call can scan for preferred femto cells, for instance, and report the femto pilots, which can potentially be off-frequency from the current channel of operation, and report this pilot in the PSMM (pilot strength measurement message) allowing the macro system to hand-in to a specific femto cell. Small outages during scans can have negligible impact such as if one or two packets are missed in a voice call application.

Discovery can entail location-dependent determination (e.g., macro base station triangulation, global positioning system, local broadcast channel, etc.) of being within range of an open femtocell whose identity was manually learned, accessed via a distributed neighbor list, etc. The defined area/volume for each femtocell can be circular, spherical, segmented linear, cylindrical polygonal, irregular, etc. The definition of the location can comprise various geographical coordinate systems (e.g., latitude, longitude). In one aspect, the coordinates further comprise a geodetic height or altitude center point or range. If learned and recognized by broadcast geographic coordinates, the UE can advantageously tolerate small changes in location without having to relearn the identity of the femtocell. The type of access (e.g., unlimited, restricted, etc.) afforded is advantageously communicated to end user via a display indicator.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

In FIG. 1, a communication system 100 enables a mobile station or user equipment (UE) 102 to increase its access to a core network 104 to areas not served by a macro base station (e.g., evolved Base Node (eNB)) 106 by using a small base station (e.g., femtocell) 108. Femtocells can be placed within a structure 110 that degrades reception of the eNB 106. The femtocell as often owned by end user 112 and interface to the core network 104 by a broadband network (e.g., Internet) 114 can provide an economic advantage over usage fee rates for using the eNB 106 as a Radio Access Technology (RAT).

Moreover, increasingly users rely upon wireless communication access at their place of employment or at home rather than having a landline telephone or other communication device.

In an illustrative telecommunication system 100, a femtocell 108—originally known as an Access Point Base Station—is a small cellular base station, typically designed for use in residential or small business environments. It connects to the service provider's network via broadband (e.g., Digital Subscriber Line (DSL) or cable); current designs typically support five (5) to one hundred (100) mobile phones in a residential setting. A femtocell allows service providers to extend service coverage indoors, especially where access would otherwise be limited or unavailable. The femtocell incorporates the functionality of a typical base station but extends it to allow a simpler, self contained deployment. An example is a femtocell containing a Node B, Radio Network Controller (RNC) and GPRS Support Node (SGSN) with Ethernet for backhaul. Although much attention is focused on 3GPP2 domain—1X and DO system, the concept is applicable to all standards, including GSM, CDMA2000, TD-SCDMA, UMTS and WiMAX solutions. It is further disclosed herein procedures that equally apply to finding femto cells across technologies, e.g., being in a 1X macro system and based on the location relative to the macro system looking for a UMTS femto box etc. Position determination (i.e., user zone determination using PUZL) can be used to find specific WLAN hotspots as well. For a mobile operator, the attractions of a femtocell are improvements to both coverage and capacity, especially indoors. There may also be opportunity for new services and reduced cost. The cellular operator also benefits from the improved capacity and coverage but also can reduce both capital expenditure and operating expense. Femtocells are an alternative way to deliver the benefits of Fixed Mobile Convergence (FMC). The distinction is that most FMC architectures require a new (dual-mode) handset which works with existing home/enterprise Wi-Fi access points, while a femtocell-based deployment will work with existing handsets but requires installation of a new access point.

Advantageously, the UE 102 is provisioned with a location determination component 116 to determine when proximate to the femtocell 108 for which authorization is available for open use. A small base station (SBS) access data structure 118 is updated and referenced to determine if the femtocell 108 is on a "white list" 120 of accessible femtocells or is on a "gray list" of restricted use (e.g., 911 emergency use) 120 or "black list" 122 of being inaccessible, the latter cases depicted by an alien femtocell 123.

UE 102 can identify the associated femtocell 108 by a geographic location message 124 broadcast by the femtocell 108. Advantageously, a movement tolerance component 126 of the UE 102 can identify the associated femtocell 108 even if moved slightly, changing the reported geographic location. In addition, a defined coverage area 128 of the femtocell 108 can be area based or three dimensional (e.g., spherical, segmented linear, polygonal. The SBS access data structure 118 can further support a defined coverage area 128 including vertical portions of a building. Alternatively or in addition to geographic location message 124, UE 102 can receive geographic location 130 from the macro base station (eNB) 106. For instance, the eNB 106 can send a neighbor list 132 that contains white list, gray list or black list information. As another example, the UE 102 can perform location estimates based upon power/direction or triangulation performed based upon one or more eNBs 106. Alternatively or in addition, the UE 102 can receive geographic location 134 based upon reception of global positioning system (GPS) satellites 136.

The UE 102 extends its battery service life by using DTX/DRX transceiver 131 that discontinuously transmits and receives, supporting improved scan and acquisition of femtocells 108. In addition, this improved scanning and acquisition provides a select-right paradigm of acquiring femtocells, including addressing different usage models, support for multiple femtocells, finding the femto EV-DO system associated with the femto 1X system, acquiring femtocell when no or limited macro coverage is available, supporting a EV-DO only femtocell that does not have a 1X system. The fields required for femto related provisioning are addressed. A SBS access data structure provides a corresponding support. With the provisioned information, procedures in the mobile station (UE) 102 can efficiently select the femtocell 108. In particular, the mobile can learn the white and black list information for femto pilot signals a network. Account is made for avoiding the alien femtocells 122. Provisioning can be by one or more of over-the-air transmission from a network radio access, insertion of computer-readable storage medium (e.g., smart card), installation by an original equipment manufacturer (OEM) or programmed at a point of sale. In one aspect, the smart card can be moved to another UE (e.g., cellular devices, mobile station, access terminals, handsets, etc.). In another aspect, the UE can synchronize its updated database information on a local storage device (e.g., home computer) with a user interface that allows selective manual or network-provided options for maintaining the custom SBS (e.g., femto cell) entries. In another aspect, the network can provide an automated backup system over the air that facilitates transferring the information to another UE or reinstalling on the same UE. In yet another aspect, such uploads to a network can be used to benefit other devices. Further, such uploads can be responsive to network requests to the device. In yet a further aspect, the database can be structured as record based to allow for the information to be pushed to a device by multiple network entities apart from allowing the device to add entries to table autonomously or through user input.

In one aspect, detect and break system selection loops executed by the UE 102 are supported to address the issue of femto identification using existing air-interface standards which do not explicitly have 'femto' ID broadcast messages. Such ID information is needed for the UE 102 to determine the identity of the femto 108, 122 and to check if the femto 106, 122 is blacklisted, white-listed, or not appearing in any list. In addition, such aspects address the issue of protecting a mobile-learned femto identity entry or a white list or blacklist entry from over-riding by the network or from deletion by the network.

In one particular aspect, the latitude and longitude information broadcasted by a cell is used to help identify whether the cell is a femtocell (as opposed to a macro-cell 106). Alternatively or in addition, such information includes geodesic height, height above ground, or altitude information. Alternatively or in addition, the format of the geographic information is in another geographic coordinate system. Latitude and longitude values can be based on several different geodetic systems or datums, the most common being WGS 84 used by all Global Positioning System (GPS) equipment. Other datums however are significant because they were chosen by a national cartographical organization as the best method for representing their region, and these are the datums used on printed maps. Using the latitude and longitude found on a map may not give the same reference as on a GPS receiver. Coordinates from the mapping system can sometimes be changed into another datum using a simple translation. For example to convert from ETRF89 (GPS) to the Irish Grid by 49 meters to the east, and subtracting 23.4 meters from the north. More generally one datum is changed into any other datum using a process called Helmert transformations. This involves converting the spherical coordinates into Cartesian coordinates and applying a seven parameter transformation (i.e., translation, three-dimensional rotation), and converting back. Data projected in latitude/longitude is often represented as a 'Geographic Coordinate System'. For example, data in latitude/longitude if the datum is the North American Datum of 1983 is denoted by 'GCS North American 1983'.

Such information could then be stored in the mobile station (MS) or UE 102 so that the next time the UE 102 sees the same femtocell (identified by the latitude and longitude and possibly other information), the UE 102 may recognize the femtocell (and immediately determine if the femtocell is a valid femtocell or not—based on the stored information in its blacklist/white list, for example). In another aspect, a mask length is used to help "round out" or roughen the precision of the longitude and latitude information. For example, each could use 24 bits. A mask length could indicate which of the LSB (Least Significant Bits) should be ignored. Alternatively, a distance determination can be made from known femtocells with a threshold applied. The need for rounding out is that the femtocell-transmitted longitude and latitude information could change on the order of micrometers, centimeters, etc. (e.g. if a femtocell 108 on table was lightly bumped as depicted at 138). In an illustrative aspect, the femtocell 108 has GPS capability and had such GPS information broadcasted by the femtocell 108. Such mask at the UE 102 provides a means to help the UE 102 recognize that the femtocell 108 with slightly moved longitude/latitude (lat/long) information is still the same femtocell. In additional aspects, finer identification of a femto-cell 108 (e.g., ideally for unique femto-cell identification) are supported by additional femto-cell identifiers.

Further enhancements are provided that supporting manual system selection with human-readable femto identification (e.g., for manual black list/white list management and manual scans/scans for a femto-cell. This is depicted as a user interface 140 of the UE 102 that provides a manual learn control 142 as well as an access indicator 144 that gives feedback as to the type of access (e.g., macro, open femto, restricted, unknown femto requiring authentication codes). Thereby, a mobile handset display control functions are provided that relate to femto access. Version control can be provided for SBS access data structure (e.g., Preferred User Zone List (PUZL) databases). Advantageously, database management can be provided for partitioning contents (e.g., user zones) into two sections with one for network-provisioned information and second for mobile-learned information. Support can also be provided for active call hand-offs. In another aspect, PUZL entries themselves can form hierarchical networks. Once a system based on the user zone is found, that new system itself can indicate to the device to belong to another user zone, prompting finding other femto cell within this other user zone. Thereby, such hierarchical searching can be used to enter a campus with a larger footprint femto cell used to direct the device to a specialized femto cell within specific parts on the campus. Thus, the PUZL database can be iterative in its nature and operation.

Figure 2:
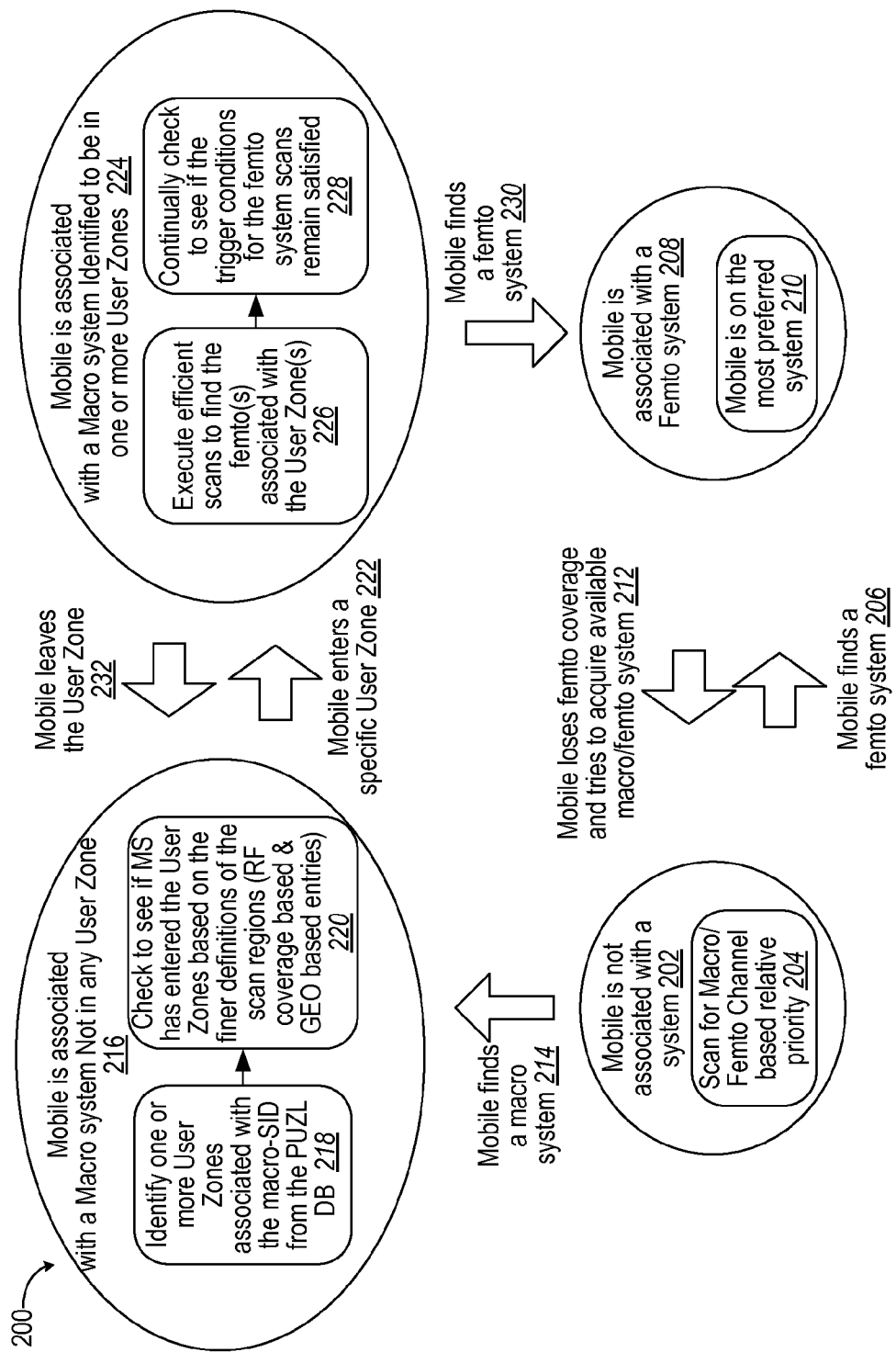
FIG. 2 illustrates a state diagram for a mobile station scanning and acquiring a macro or femto system in accordance with relative priority.

In FIG. 2, a methodology or sequence of operations 200 are provided illustrating states of mobile station or UE moving into coverage areas of macro systems and various types of small base stations (e.g., femtocells). In state 202, the mobile station is not associated with a macro or femto system, and thus performs a scan for a macro/femto channel based upon relative priority (block 204). If the mobile station finds a femto system as depicted at 206, then a state 208 is entered where in the mobile station is associated with a femto system, which in the illustrative depiction is the most preferred system (block 210). If the MS loses the femto coverage as depicted at 212, then the mobile station returns to state 202. Should the mobile then find a macro system based upon relative priority as depicted at 214, then a state 216 is entered wherein the mobile station is associated with a macro system but is not in any user zone. In an exemplary aspect, cost can be decreased by finding an open user zone, so the mobile station continues to identify one or more user zones associated with the macro-SID from the PUZL database (block 218). A check is made to see if the mobile station (MS) has entered the user zone(s) based upon finer definitions of scan regions (e.g., RF coverage based and/or geographic-based entries) (block 220).

If the mobile station enters a specific user zone as depicted at 222, then a state 224 is entered wherein the mobile station is associated with a macro system identified to be in one or more user zones. The mobile station executes power/computation efficient scans to find the femto system(s) associated with the user zone(s) (block 226) and continually checks to see if the trigger conditions for the femto system scans remain satisfied (block 228). For instance, the frequency of checks can be of higher frequency since the mobile station expects to acquire a preferred femto system. By contrast, back at block 220, the checks can be relatively infrequent made in relation to the mobility of the mobile station. If the mobile station finds a femto system as depicted at 230, then state 208 is entered. Otherwise, if the mobile station leaves the user zone as depicted at 232, then state 216 is entered.

Figure 3:
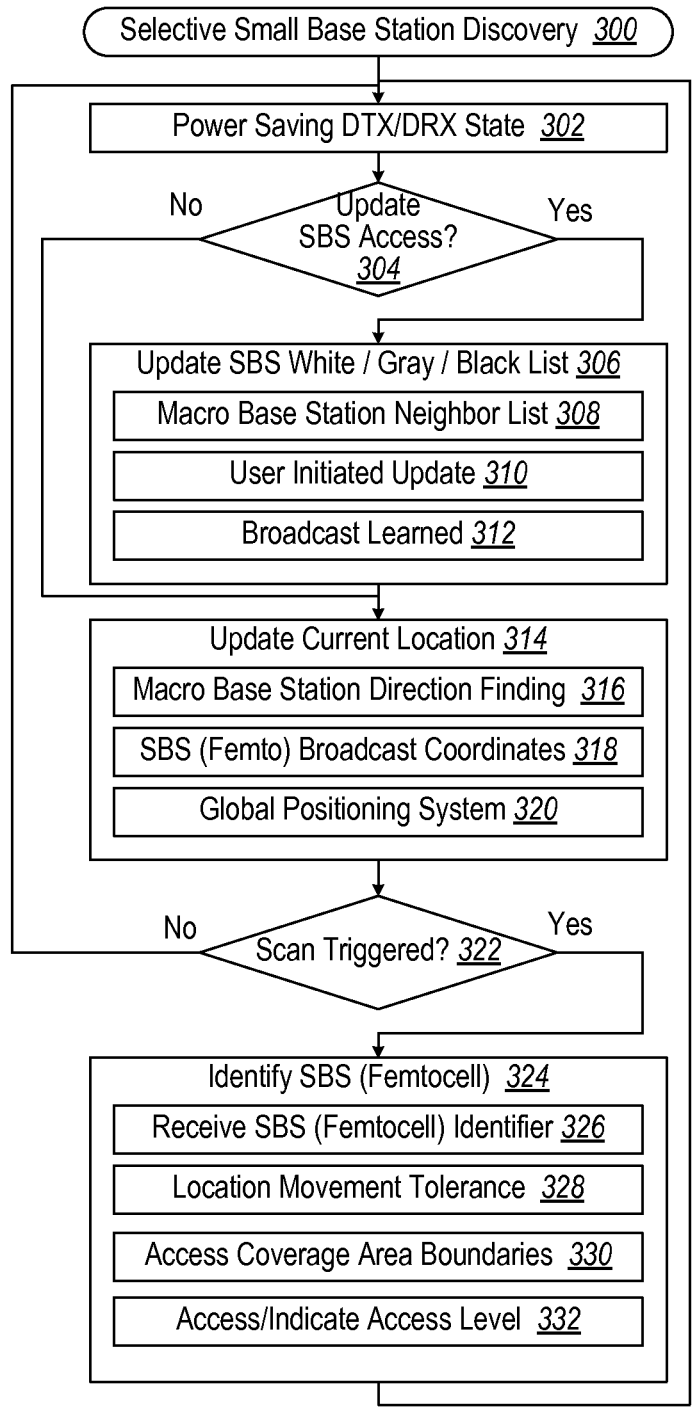
FIG. 3 illustrates a flow diagram of a methodology for scanning and acquiring a femto system in accordance to a power efficient method.

In FIG. 3, a methodology or sequence of operations 300 are provided for selective, power-efficient small base station discovery and acquisition. In block 302, the mobile station is in a power off or power conserving DTX/DRX state. A determination is made in block 304 that update information is available for small base stations (e.g., femto systems). If so, femto system information can be used to update a white list, a black list, or a gray list (e.g., limited purpose or high cost use) (block 306). The update information can be provisioned from a macro base station neighbor list (block 308). Alternatively or in addition, the update can be initiated upon user command or be received from user input (block 310). Alternatively or in addition, the femto system parameters can be discovered when scanning such as by detecting an identifying broadcast (block 312). The latter can facilitate RF-based selective scanning and acquisition. The broadcast signal can be generally available such that intermittent scans will detect the femto system.

If no update needed in block 304 or after being completed in block 306, then a further monitoring of current location can be performed to facilitate geographic-based scanning and acquisition (block 314). For example, the macro system can provide a location, be associated as being in the area of a femto system, or be used to determine location (e.g., direction/strength of signal or triangulation) (block 316). Alternatively or in addition, the femto system can broadcast geographic coordinates that can be used (block 318). For example, even an alien femto cell can provide a geographic update even though not usable for access. Alternatively or in addition, another source of location information can be used such as global positioning system (GPS) (block 320).

In block 322, a determination is made that a scan is warranted, such as due to location change or RF-based triggering. The scan can receive sufficient identifying information from the femtocell for these purposes (block 324). For instances in which this identifying information is the geographic location of the femtocell (block 326), a location movement tolerance can be incorporated so that a slight change in position does not defeat the identification (block 328). This feature can maintain the ease of deployment for end users to place a femtocell without having to manually assign a unique identifier or to manually enter a geographic location (e.g., latitude/longitude). With the location information, coverage area boundaries can be determined (e.g., circular, cylindrical, segmented linear, polygonal, spherical, etc.), which thus can include a vertical dimension (e.g., a floor of a building) (block 330). The identification of an acquired femtocell can further be communicated to a user, such as presenting an icon or text similar to a roaming indication so that the user is aware of what usage restrictions/cost are applicable (block 332).

Figure 4:
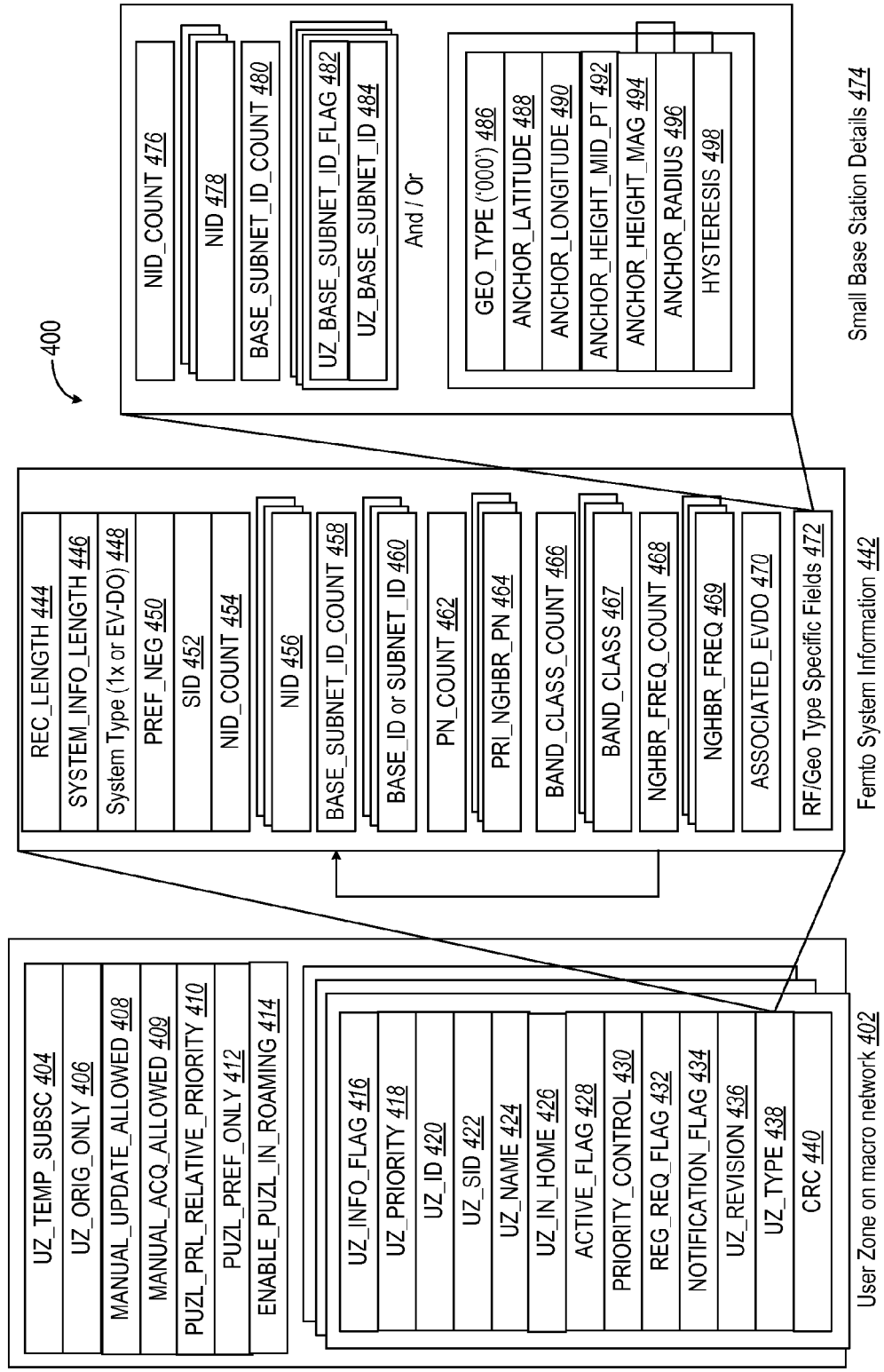
FIG. 4 illustrates a diagram of a user zone data structure.

In FIG. 4, a data structure 400 illustrates advantageous capture of femtocell information for enhancing scanning and access by having a user zone data structure 402 that can be provisioned and maintained from a macro network for a mobile station or UE. For each UE, a UZ_TEMP_SUBSC (user zone temporary subscriber) field 404 can be used. UZ_ORIG_ONLY (User Zone Origination Only) flag 406 that is set by the base station accordingly to indicate whether or not the mobile station is permitted to originate calls only when within the serving area of a currently assigned User Zone. If call origination is only allowed within an assigned user zone, UZ_ORIG_ONLY='1'; otherwise, UZ_ORIG_ONLY='0'. MANUAL_UPDATE_ALLOWED flag 408 indicates if manual updates are allowed in this database. When enabled this option allows the user to add records, and modify or delete the records added by the user in the database. MANUAL_ACQ_ALLOWED (manual acquisition allowed) flag 409 indicates if the user is allowed to manually initiate scan and acquisition of a specific femto as specified in the femto database. PUZL_PRL_RELATIVE_PRIORITY (preferred user zone list preferred roaming list relative priority) field 410 supports PUZL based Enhanced System Selection (ESS) first time power up. The PUZL_PRL_RELATIVE_PRIORITY field indicates whether or not femto scans based upon femto cell entries in the database have higher priority over macro cell scans based upon macro cells entries in the database. PUZL_PREF_ONLY flag 412 is set to '1' to indicate that when the mobile station performs scans based on PUZL, the mobile station is restricted to acquire only those valid systems identified in PUZL. When set to '0' this field indicates that when the mobile station performs scans based on PUZL, it may acquire valid systems identified in PUZL and other systems not identified in PUZL. ENABLE_PUZL_IN_ROAMING field 414 is to allow the network to enable/disable PUZL when the MS is in Roaming state.

For each femtocell that is identified in the user zone 402, the following fields are provisioned/maintained. UZ_INFO_FLAG field 416 defines whether the femtocell belongs to global white list or black lists for Insert/Update/Delete statements. UZ_PRIORITY field 422 in one aspect can indicate that one UZ can be used by a MS at a given time. Given the possibility of overlapping UZ (e.g., global UZ and office UZ), in another aspect a generalized definition allows for multiple UZ's to operate together. For instance, UZ's with the same UZ_.PRIORITY field 422 can operate simultaneously. Thus, it should be appreciated that in the case of overlapping UZ, the MS tries to camp on a UZ with the highest priority. When the overlapping UZs have the same priority, the MS can camp on either. New fields or flags (not depicted) can indicate whether to clear mobile-learned entries in SBS access data structure (e.g., PUZL), to clear mobile-learned entries outside of PUZL, or to indicate time period between periodic "flushes" of mobile-learned entries. Additional provisions can introduce Femto ID, re-planning of the femto-network, and support for allowing network to retrieve femto statistics based on MS parameter retrieval. UZ_ID field 418 is an identification number for the User Zone. This is used over the air interface to identify the User Zone to the network and the mobile station. UZ_SID field 420 is user zone system identification that is set to the System Identifier (SID) associated with the User Zone ID when UZ_INFO_FLAG is set to '1' and UZ_IN_HOME is not specified. Set to '0' otherwise. The User Zone ID and User Zone SID values together provide a unique identifier for the user zone. UZ_ID_SUFFIX field (not depicted) is used to indicate whether a UZ is network-provisioned or mobile-learned. In one aspect, UZ_ID and UZ_SID uniquely identify a UZ. By use of this UZ_ID_SUFFIX field, a UZ can be uniquely identified by UZ_ID, UZ_SID and UZ_ID_PROVISIONED. Thus it should be appreciated in one aspect that the device is associated with a single system and when camping on that one system multiple user zone can come into preview. The user zone priority is used to determine the order in which the device will scan for available femto based on the femtos parameters provided for each user zone. When the device finds a femto cell, it does not matter which user zone parameters are used, the device is move to use the femto cell.

UZ_NAME field 424 is specified when UZ_INFO_FLAG is set to '1' and omitted otherwise. Up to 12-character field can be used in the mobile station to indicate to the mobile station the name of the user zone the mobile station is currently subscribed to. UZ_IN_HOME field 426 is specified when UZ_INFO_FLAG is set to '1' and UZ_SID is set to '0'. Omitted otherwise. This field is set to 1. when this UZ applies to all home or home equivalent systems. Otherwise, it is set to '0'. ACTIVE_FLAG field 428 is specified when UZ_INFO_FLAG is set to '1' and omitted otherwise. With this flag set to '1', the mobile station must register upon entering or exiting this particular User Zone. If allowed, ACTIVE_FLAG='1'; otherwise, ACTIVE_FLAG='0'.

PRIORITY_CONTROL field 430 is 3-bit field that controls the ability of the user to modify PUZL priorities using the user interface of the mobile, such as no changes permitted, manual changes are permitted to select manually amongst the User Zones present. Upon exiting the User Zone the Mobile will revert back to the PUZL priorities. As another example, manual and temporary can be permitted wherein the user is also permitted to change the priorities of the PUZL for this User Zone. The change will remain in effect until the next power down. REG_REQ_FLAG (Registration Required) flag 432 is set to indicate that the mobile is to registers when it acquires the femto. This also indicates that when the mobile is associated with the femto network, it shall register upon switching from PN to another PN, essentially requiring it to register when switches femto even when they belong to the same SID/NID.

NOTIFICATION_FLAG field 434 provides that when this flag is set to '1' and a mobile station moves within the coverage area of a User Zone, this flag can be used to indicate that the mobile is to register when it acquires an associated system in this User Zone. This also indicates that when the mobile is associated with a system associated with this User Zone, it shall register upon switching from PN to another PN independent of whether the target system belongs to the same/different SID/NID compared to the source. UZ_REVISION field 436 indicates the current revision of this entry in the PUZL. For Broadcast User Zones, the mobile station uses this value to determine if the network has more current information about the particular User Zone. UZ_TYPE field 438 s used to distinguish between the following types of User Zones such as UZ_TYPE_1: Broadcast—RF Coverage Based UZ_TYPE_2: Broadcast—Geo-Based, UZ_TYPE_3: Mobile Specific—RF Coverage Based—Overhead Parameter Determined, UZ_TYPE_4: Mobile Specific—Geo-Based, UZ_TYPE_5: Mobile Specific—Geo Based—Separate Carrier, and UZ_TYPE_6: Mobile Specific—RF Coverage and GEO Based—Separate Carrier. CRC field 440 is cyclic redundancy check for validity testing.

Additional femtocell system information 442 is access based upon the UZ_TYPE field 438. In an illustrative aspect, the information 442 includes REC_LENGTH field 444 is set to the total length of this record in bytes including this field. SYSTEM_INFO_LENGTH field 446 is set to the length in bytes of the system information contained in this record. This covers all the fields starting with this field up to and including the ASSOCIATED_EVDO field. SYS_TYPE field 448 indicates system Type (e.g., 1x or EV-DO). PREF_NEG field 450 provides that when set the current record is treated as system where the mobile shall not associate itself with. Used to specify whether the record is a black list or white list indicating, respectively. The mobile should not connect to systems indicated by the record or is allowed to connect to systems indicated by the record. SID (System Identifier) field 452 indicates associated with the Femto User Zone. NID_COUNT field 454 give the count of the number of NID in the SID associated with the Femto User Zone. NID fields. NID fields 456 are set of Network Identifier(s) (NID) of the separate RF carrier. BASE_SUBNET_ID_COUNT field 458 is for when the system type is a 1xRTT system for setting to the count of BASE_IDs of the separate RF carrier. When the system type is a 1xEV-DO system, this field is set to the count of SUBNET_IDs of the separate RF carrier. These identifiers are provided by BASE_ID or SUBNET_ID field 460. PN_COUNT field 462 provides the number of PNs (pseudo-noise offsets) that are associated with the Femto User Zone. PRI_NGHBR_PN field 464 is the set of PNs associated with the Femto User Zone. BAND_CLASS_COUNT field 466 provides the number of band classes associated with the Femto User Zone. BAND_CLASS 467 is set to the Band Class number corresponding to the frequency assignment of the channel specified by this record. NGHBR_FREQ_COUNT field 468 is set to the number of frequencies of the separate RF carrier. NGHBR_FREQ fields 469 is the set of frequencies associated with the Femto User Zone. ASSOCIATED_EVDO field 470 points to a UZ with the associated 1xEV-DO system and further provision is made in the femto database for specifying the 1X system and its associated EV-DO system. RF/Geographic Type Specific Fields 472 defines attributes of the coverage area.

In particular, additional information 474 is provisioned/maintained linked to the RF/Geographic Type Specific Fields 472 such as NID_COUNT field 476, NID_COUNT field 478, BASE_SUBNET_ID_COUNT field 480, UZ_BASE_. SUBNET_ID_FLAG field 482, and UZ_BASE_SUBNET_ID fields 484 for RF-based information. Alternatively or in addition, the additional information 474 can include GEO_TYPE ('000') field 486, ANCHOR_LATITUDE field 488, ANCHOR_LONGITUDE field 490, ANCHOR_HEIGHT_MID_PT field 492, ANCHOR_HEIGHT_MAG field 494, ANCHOR_RADIUS field 496, and HYSTERESIS field 498 for geographically based information. However, it should be appreciated with the benefit of the present disclosure that a preferred node (e.g., small base station, femtocell, pico cell, hierarchical cell structure) can be scanned for even when no position information (user zone) is available. For instance, PUZL parameters can be used when a device is unable to locate macro service based upon the provisioned PRL. In an exemplary implementation, a preference flag can be set to allow the device to first look for PUZL based entries before attempting to use the PRL or vice versa.

In other aspects, additional fields (not depicted) MCC, MNC can be used to help identify a femto-cell across countries and networks for a more comprehensive identifier. EXTENDED_BASE_ID (i.e., Femto-cell ID can be an optional field using "Included" Flag that is used, in conjunction w/ SID/NID/Base_ID to identify a Femtocell uniquely. This can aid a MS in black listing or white listing a Femto-cell and in performing idle-hand-off. The Extended Base_ID can be broadcasted by a base-station in an overhead signaling message. BASE_SUBNET_ID_TEXT can be an optional field using "Included" Flag that is used as a human-readable femto-cell identifier—to facilitate white/blacklist management by a user. As such, can be set to a human-readable text string to facilitate identification of the base station to aid in manual scans and UZ management by a user. MSC_ID, CELL_ID can be used, in conjunction with Femto-cell ID to aid in active call hand-in and femto-cell identification. These three fields together, which would be broadcasted by a femto-cell, would be transmitted to the source sector to prepare the femto-cell backhaul for the active call hand-off. PREFERRED_UZ_IND can be used to indicate a preferred femto (e.g., an "all-you-can-eat" air-time femto). It can also be set to the value to indicate the preferred level of a UZ. UZ_LIST_ID can be used for identifying a SBS access data structure (e.g., PUZL), which can be similar to the PR_LIST_ID for identifying PR. Allows, for example, a network to determine the PUZL version before attempting to update it. The mobile station can set this field to the value of the Preferred User Zone List Identification assigned for the preferred user zone list (PUZLs-p) by the base station.

UZ_DISP_IND field can be used by a MS to manage displaying femto-cell related indicators on the MS's display, which can be similar to the ROAM_DISP_IND used to manage the roaming indicator. For example, the UZ_DISP_IND can indicate that the MS is camped on a UZ (or femto-cell), a signaling-associated UZ (or femto-cell), an open-associated UZ (or femto-cell) or a preferred UZ (femto-cell). For instance, the lack of a femto-cell icon can indicate that the displayed signal strength pertains to a macro cell, whereas presence of the femto-cell icon indicates open access. Alternatively or in addition, one or more femto-cell icons, text, graphics, etc., can provide an intuitive indication as to the level of access and cost to use, such as whether at an unlimited usage billing plan. Further, an indication can be given that an alien or restricted femto-cell will accept an emergency call or open access at a usage cost.

The mobile station shall set this field to the value of the action for displaying the default UZ indicator on the mobile station's display such as ON, OFF, or FLASHING. Provisions can be made to prevent size of limit of UZ from exceeding a limit. Geo_Type_Specific_Fields_Included can allow for Geo-based and/or RF-coverage based UZ definitions.

By virtue of the foregoing, it should be appreciated that disclosures herein can be applied not only cdma2000 systems but also other cellular systems such as UMTS, WiMAX, etc., in order to improve the scans and acquisition of the femtocells of different types having different usage modes (e.g., personal, community, and a network of hotspots models). For instance, the UE can find the femto EV-DO system associated with the femto 1X system, can acquire femtocell when no or limited macro coverage is available, and can support a EV-DO only femto that does not have a 1X system. A personal hotspot model can be for Femtocells deployed in private homes and small home offices. Each femtocell allows access only to a small number of specific users. Community hotspot model can be Pico or femtocells deployed in enterprises, campuses, apartment buildings, etc., such as a network of small number of pico or femtocells all concentrated in a fairly small geographic area allowing access only to specific group users in that area that change infrequently. Distributed "network of hotspots" model can be a geographically-distributed network of pico or femtocells deployed across hotel chains, airports, coffee shops, etc. Alternatively, the networks of pico or femtocells can allow access to large number of users not confined to any one geographic location.

Mobile stations can be allowed to associate with multiple femtocells. For Femto associated EV-DO systems, Femto related provisioning can enable the mobile to acquire the femto 1X system and find the associated femto EV-DO system. For EV-DO Only femtocell, Femto related provisioning can support system selection of an EV-DO only femtocell. As one variation, a macro 1X system can support the circuit-switched services and the EV-DO service is supported over the EV-DO only femtocell. As another variation, consider a scenario of when the EV-DO femtocell/system is able to support all the services and the mobile station does not need to be associated with a 1X system. The system selection procedures can allow for EV-DO only femtocell without having the mobile station associate itself with a 1X system first. Further consider Femto deployments where there is poor or no macro coverage. Search procedure in the mobile station can activate scans based on Femto related provisioning when macro coverage is not available.

It should be appreciated that the SBS access database (e.g., PUZL) can be of a size that lends itself to deployment on insertable computer-readable storage medium (e.g., R-UIM (removable user identification module)/CSIM (CDMA Subscriber Identity Module) cards). Provisioning/search enablement can be dependent upon the capabilities of the mobile station. As a further aspect, this capability can be user selectable, such as choosing only one User Zone type of "RF Coverage and GEO based—Separate Carrier" approach for femto related support. As another example, the coverage area can be limited to a certain shape (e.g., circle area-based mechanism for GEO based scan). Byte alignment of individual fields can be provided to simplify parsing trading off with the required increase in database size. In another aspect, record length can be added allowing for the mobile to read the full record from the R-UIM/CSIM card and execute the parsing afterwards.

The small base station (SBS) access data structure can be defined so that it can handle both macro network provisioned and user-provisioned small base station entries. Both RF coverage based on GEO based entries are provided to allow for a well tuned region where the mobile scans for channel(s) where femtocells are deployed as identified. Radio Frequency (RF) Coverage based refers to using the SID/NID/BASE_ID/SECTOR_ID of the macro network to restrict the region of scan for the femto system. GEO based refers to using the LAT/LONG as transmitted by the base stations in determining region of scan for the femto system. PUZL_P_REV can be incremented to support the changes on a new version addressing backward compatibility.

PREF_ONLY field can be added to restrict the mobile station to acquire only systems that are identified. All other systems will be ignored by the mobile if this flag is set and when the mobile station is performing scans. Thereby, this aspect can fine tune the regions where the mobile will scan for the femto systems. A very tight search region will enable efficient battery usage. User Zone on the macro can fine tuned information.

With regard to RF Coverage based and GEO based searching, GEO based can include the height information to address floors within a building. UZ_NID_COUNT/UZ_NID field can be the set of NIDs of the macro network that is considered to belong to this User Zone. UZ_BASE_SECTOR_ID_COUNT can be the count of the number of BASE_IDs or SECTOR_IDs defined. UZ_BASE_SECTOR_ID_FLAG can identify if the current records is a BASE_ID for 1xRTT system or SECTOR_ID for a 1xEV-DO system. The User Zone BASE_ID (UZ BASE ID) is the set of BASE_IDs of the macro network that is considered to belong to this User Zone. The UZ_NID and UZ_BASE_ID can be defined to fine tune the region in the macro network where the mobile will scan for PUZL entries. This can be useful when the macro does not broadcast the LAT/LONG. Information associated with multiple macro BTSs (base transceiver stations) is identified so that the mobile station can use the appropriate information based on the direction in which the mobile station is entering the femtocell coverage. In addition, the mobile station can use the information across multiple BTSs. ANCHOR_HEIGHT can be set to the height above the WGS-84 reference ellipsoid, in units of 1 meter, in the range from −500 m to 15883 m. This is intended to address tall buildings where the mobile can be at the same LAT/LONG as the femto but still be out of femto coverage. Hysteresis value can be expressed in units of 0.25 second. The mantissa is defined as '1' and the 4 bits represent the exponent. This provides hysteresis values of 1, 2, 4, 8 . . . 128×0.25 sec. The hysteresis value delays the exiting of a user zone by a distance offset determined by the value of the hysteresis. The entry point for a user zone is the radius value (horizontally) or anchor height magnitude value (vertically).

With regard to blacklisting of specified systems or cells that the MS is not to access, a "black list" entry can be associated with a specific data structure entry, such as a set of PN-offsets for a given carrier with an option to list individual PN-offsets or specify a range. The black list entry can include a set of NIDs for a given SID with an option to list individual NIDs or use bitmask. The black list entry can include a set of BASE_IDs with an option to list individual BASE_IDs or use bitmask. The black list entry can includes a set of SectorIDs with an option to list individual SectorIDs or use bitmask. The Black list can be used to assist access control, such as preventing non-femto subscribers' handsets from selecting femtocells. As another example, can be used where very narrowly specified SBS access data structure entry is not suitable. Can be used to refine widely specified entry (e.g., for community hotpots and distributed networks of hotspots model).

Provisions can allow for the mobile station to indicate its total data structure memory size restriction (e.g., size of R-UIM) to the network based on existing fields. The mobile station could report the memory size it can handle. Memory provisioning in the R-UIM card should account additional space to allow for temporary storage for updates prior to committing into permanent storage. The R-UIM can provide byte alignment of individual record, can allow for over-the-air procedure to add/delete/update individual records, and can add integrity checks for the individual records and/or for the full table. The R-UIM can allow for the femto entries to be specified in the database without having to specify the associated macro information and can further have specific record lengths for individual records so that the navigation across records can be done easily. The R-UIM can provide links within the individual records so that the required parts of the record can be accessed easily. Restrictions on the network can be imposed to provision the SBS access data structure (e.g., PUZL) based on the mobile station capability. For example, the R-UIM can allow for the mobile station to indicate its capability to support for the individual User Zone types. For instance, the mobile station can choose only one User Zone type of "RF Coverage and GEO based—Separate Carrier" approach for femto related support. The restriction can entail allowing for the mobile to indicate its capability to support only the circle based mechanism for GEO based scan. In addition, physical or data provisions can clearly separate provisioned information and MS learned information.

Figure 5A:
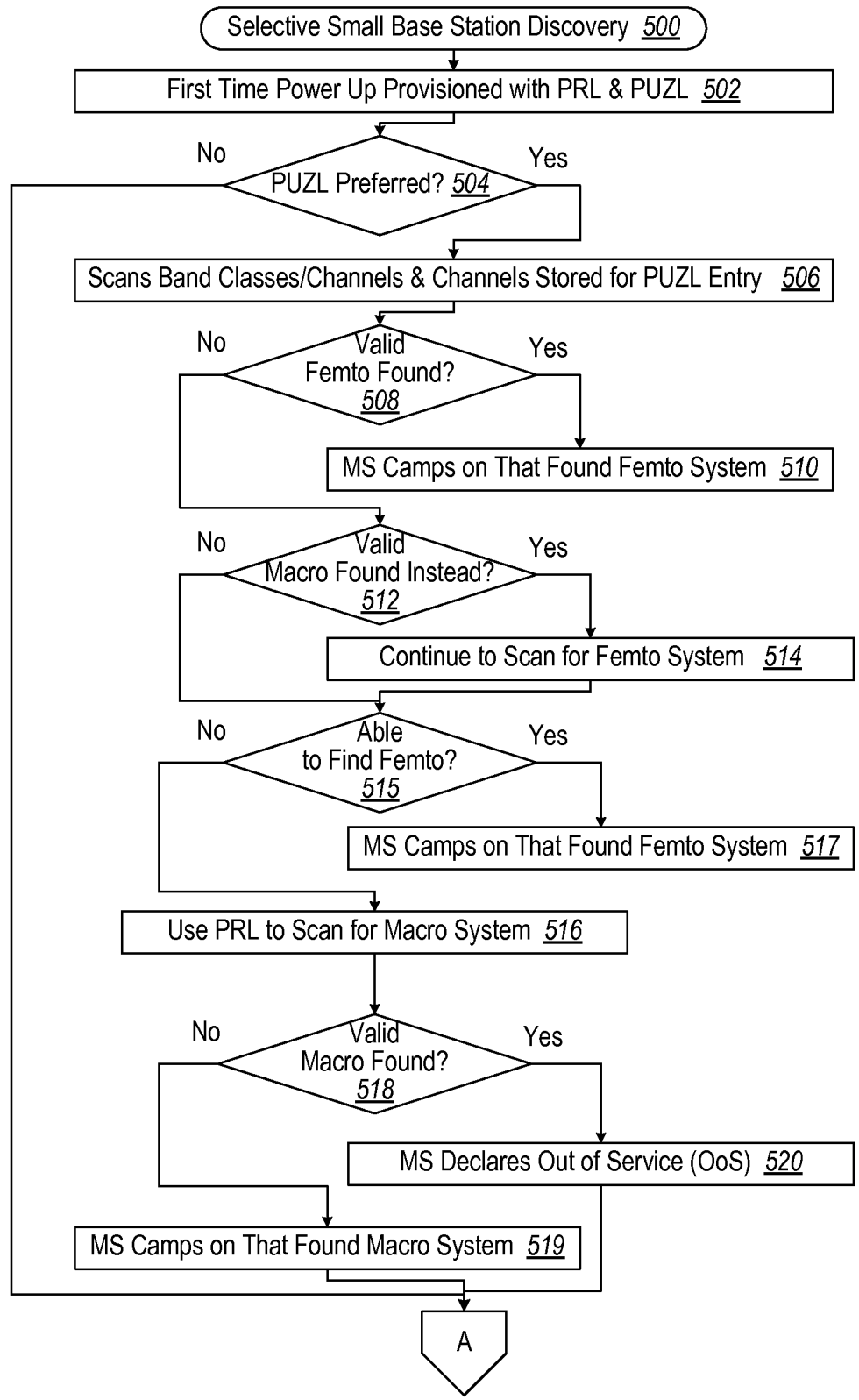
FIGS. 5A-5B illustrate a flow diagram of a methodology or sequence of operations for selective small base station discovery.

In FIG. 5A, a methodology or sequence of operations 500 is depicted for a mobile station or UE to perform power optimized small base station scanning and acquisition. For first time power up as depicted at 502 with both preferred roaming list (PRL) and small base station access data structure (e.g., PUZL—preferred user zone list), a determination is made as to whether PUZL entries are preferred over PRL entries (block 504). If so, then MS scans for band classes and channels defined in the PUZL database (block 506). If valid femto system found (block 508), then the MS camps on that femto system (block 510). Else if the mobile system finds a macro system instead (block 512), the mobile station continues to scan for available femto systems (block 514). If unable to find a femto system (block 515), then preferred roaming list (PRL) procedure is used to scan for a macro system (block 516), else MS camps on found femto system (block 517). If found (block 518), the mobile station camps on the macro system (block 519), and else declares out of service area (block 520).

Figure 5B:
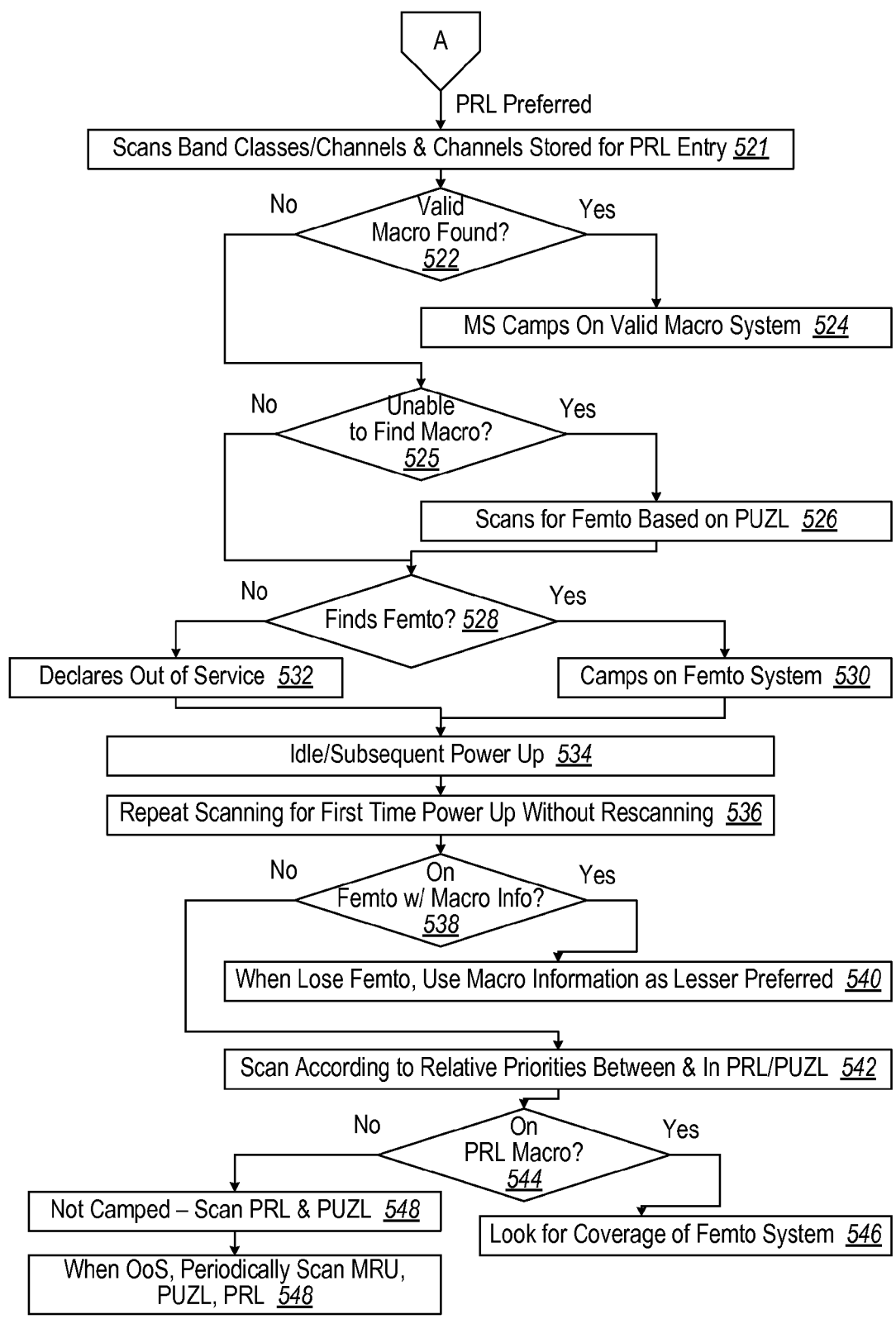

Continuing in FIG. 5B, if back at block 504 PRL is preferred over PUZL, then the MS scans for band classes and channels defined in a PRL database (block 521). If a macro system is found (block 522), then the MS camps on it (block 524). If unable to find a macro system in the PRL database (block 525), then the MB scans band classes and channels as defined in the PUZL database (block 526). If a femto system is found (block 528), then the MS camps on it (block 530), else declares out of service area (block 532).

Should the mobile station go idle for a period of time and have a subsequent power up instance (block 534), then the process can proceed as before but not rescanning channels recently scanned (block 536).

The methodology or sequence of operations 500 continues with a determination of whether the MS is camped on a femto system for which the PUZL database has associated macro information (block 538). For instance, when the MS is going out of coverage of a femto system, the PUZL database can facilitate identifying a macro system that is treated similar to a lesser preferred system in the same geographic area of the PRL entry (block 540). Else, if camped on a system in the PUZL database that does not have macro information (e.g., femto in area not served by macro system), then the MS will start scanning in accordance to relative priorities between and within the PRL list and PUZL database (block 542).

If a determination is made that the mobile station is camped on a system that is defined per the PRL and not defined in the PUZL database, or not an entry in either (block 544), then the MS looks for entering a coverage area of femto systems defined in the PUZL database (block 546).

If not camped on any system, the MS does not declare out of service (OoS) until it has scanned for the PRL and PUZL-based entries (block 548). When in the OoS state, the MS scans for MRU, PUZL, and PRL based entries subject to a priorities/enabling settings at required intervals (block 550).

White/black lists provisioned by the network can be policies on the deployed femtocells. User specific information in some aspects are not provisioned with the PUZL database but are implemented at the MS. However, it should be appreciated that in some instances the network can learn about the femtocell through backhaul networks and provision specific entries appropriate to a particular end user. For instance, a PUZL structure can allow for user specific information to be provisioned in parts with different entities in the network providing parts of the database. For instance, a smallest downloadable entity can be a user zone record. One or more records can be downloaded in a single command. For instance, the macro network pushes the generic policy based information with which the MS finds the required femtocells; once on the femtocell, the femtocell can push the user specific information to the MS. Note that when the network sends a PUZL Configuration Request, the MS can include all records that were pushed from the network independent of the entity that downloaded the information to the MS. Note also that the MS can also not include the MS learned information in the PUZL Configure Response message.

In a first use case, consider operator deploying femtocells in specific markets. The MS is provisioned with the macro user zones (SID/NIDs) and the associated femto deployment system information. MS uses this information to scan for available femtocells, using manual or automatic scans. The provisioned white list information allows the mobile to determine the femto channel and system information allowing the MS to explicitly scan for femtocells. With this information the MS can clearly discern between macro and femtocells as part of its scans. The network can announce to the MSs the femto parameters employed in the different markets. The white list information together with the setting of the PUZL_PREF_ONLY flag allows for the network to control the regions when the MS will execute scans looking for femtocells.

In a second use case, consider that an operator wishes to restrict the user to using one specific (home) femtocell. As a first option, the network provides the black list barring access to all femtocells. The network pushes a single record to the MS identifying the femtocell that he is allowed to access. The white list entry is treated like a hole punctured into the black list filter. Note that the white list entry can be populated by the user without network.

In a third use case, consider overlapping user zones. As another option, the network provides the black list barring access to all femtocells. The network pushes a single record to the MS identifying the femtocell that he is allowed to access. The white list entry is treated like a hole punctured into the black list filter. Note that the white list entry can be populated by the user without network.

Figure 6A:
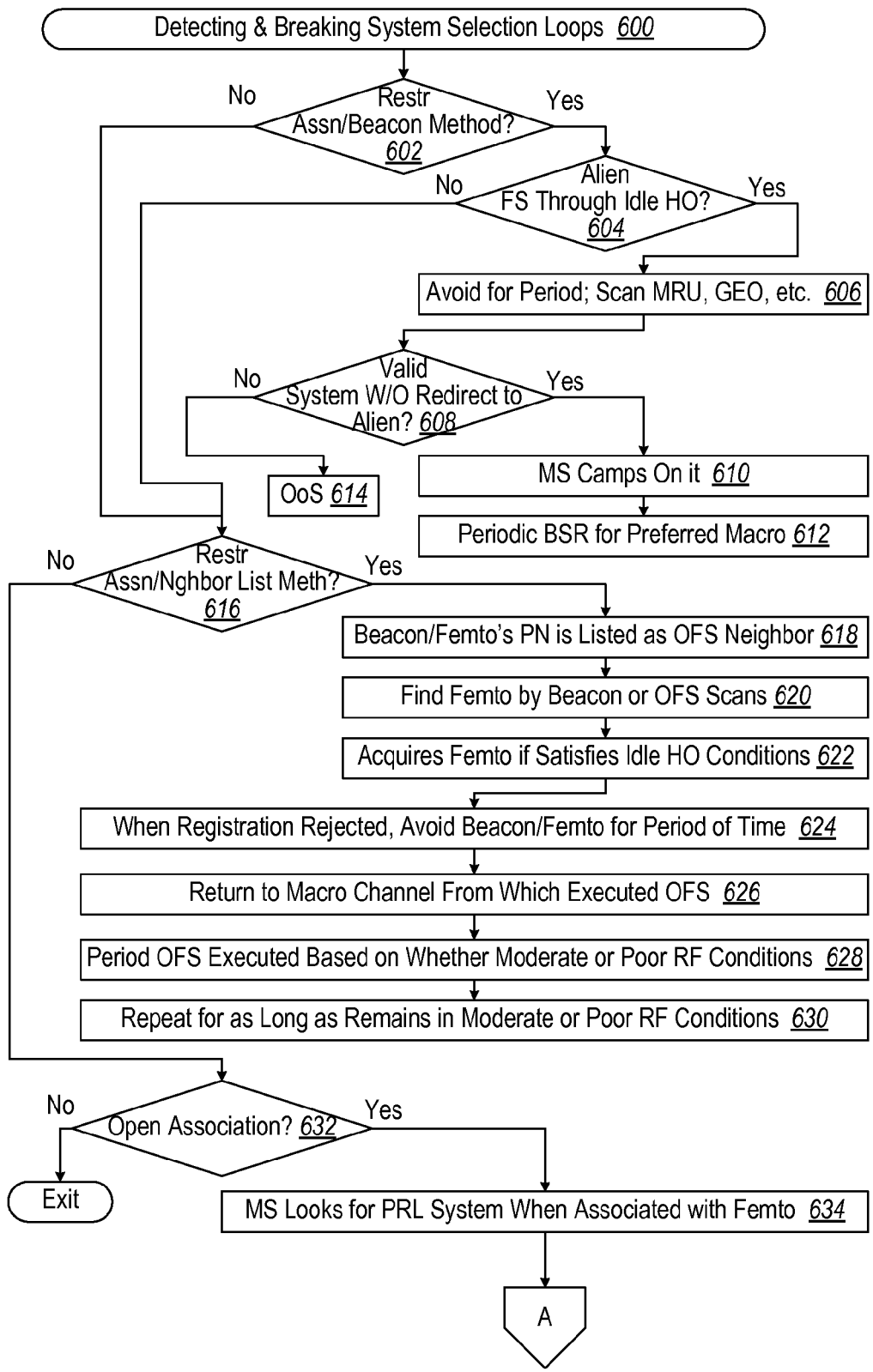
FIGS. 6A-6B illustrate a flow diagram of a methodology or sequence of operations for detecting and breaking system selection loops.

In FIG. 6A, a methodology or sequence of operations 600 are provided for detecting and breaking system selection loops in which the type of access are handled. There are several scenarios under which loops occur, causing outages in service and unnecessary redirections and access attempts. It is advantageous to detect such occurrences in the MS and extend the blacklisting of systems until conditions change in the network where it lands upon failure in acquiring a (femto) network. Change in conditions could be change in PN Offset in the network or significant changes in the pilot strength of the currently associated PN Offset.

A determination is made in block 602 that access is by restricted association with beacon method. If the MS finds an alien restricted beacon/femto through idle handover (HO) (block 604), then the MS avoids the applicable channel for a period of time (e.g., 30 seconds). The MS scans the channels (MRU ordered by current GEO, MRU, acquisition table entries), avoiding the applicable channel where the alien femto was encountered (block 606). If a valid system is found that does not redirect the MS to the alien femto channel (block 608), then the MS camps on it (block 610). The MS will then run BSR every three minutes for a more preferred macro system in the same channel as the alien restricted femto cell (block 612), returning if the alien femto is again encountered. If the MS does not find a valid system that does not direct to the channel of the alien femto system in block 608, the MS will declare OoS. After an OoS timer expires (e.g., 30 seconds), another attempt is made (block 614).

A determination is made in block 616 that access is with restricted association with a neighbor list method. The beacon/femto's PN is listed as OFS neighbor (block 618). The mobile finds the femto through the beacon or directly finding the femtocell through OFS scans (block 620). The MS can try to acquire the femtocell, if it satisfies the idle HO conditions (block 622). When the MS's registration is rejected, the MS avoids both the redirecting (beacon) and the femto channel(s) for 30 seconds (block 624). The MS returns to operating on macro channel from which it executed OFS (block 626). The MS executed OFS once every 20 seconds when the MS experiences moderate RF conditions and once every SCI of operation when the MS experiences poor RF conditions on the macro network (block 628). The MS executes this loop periodically as long as the RF conditions in the macro network remain in the moderate or poor conditions (block 630). A determination is made in block 632 that access has been made with open association. Assume that the SID/NID of the Femto is not listed in the PRL; the MS tries to find other listed system from the PRL when it is associated with the Femtocell (block 634). While this exemplary implementation omits SID/NID for a femto cell in PRL listing, it should be appreciated that in some instances the device can find the femto cell even when femto SID/NID is defined in the PRL based on the PUZL entry. When listed in the PRL, it is advantageous that this entry should be used so that BSR is avoided when camping on the femto cell.

Figure 6B:
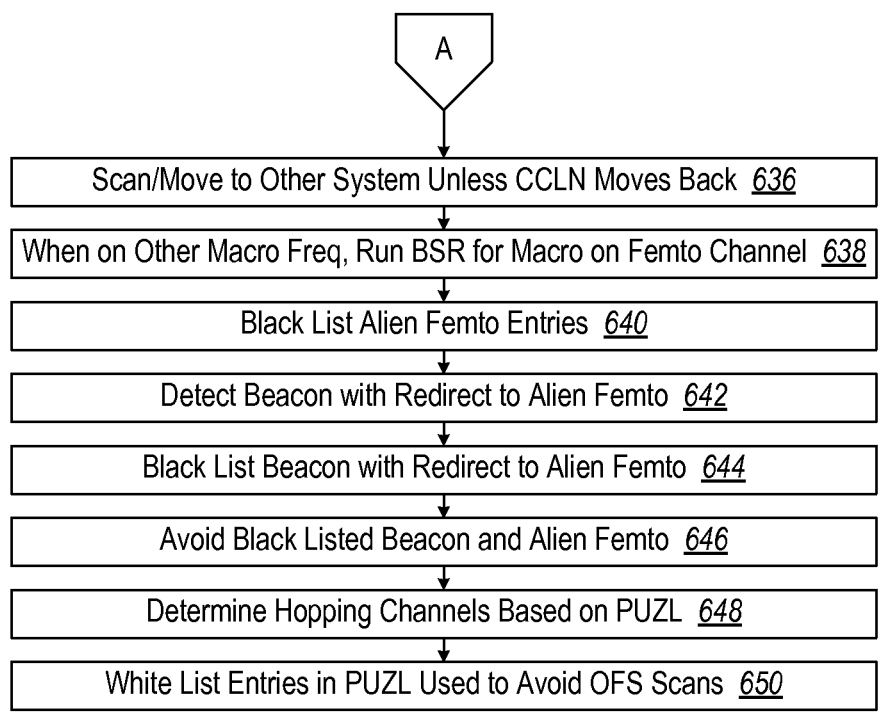

Continuing with FIG. 6B, the MS scans for systems in other channels, and move to that channel, unless the CCLM (CDMA Channel List Message) does not move it back to this Femto channel (block 636). When the MS is on the other macro frequency, it will run BSR on the channel for the macro system where the Femto happens to be deployed and will move to that system since it is the strongest pilot (block 638).

The mobile station (MS) can provide support in breaking the loops by black listing the alien femto entries encountered, prevent the MS from attempting access on the femtocell again (block 640). This can mean that when the MS does not find a valid system in another channel and the MS is not allowed to camp on the channel where the femto happens to be the strongest pilot, the MS will declare OOS and follow the OOS procedures after that. The MS can provide support by detecting a beacon redirection to an alien femtocell (block 642). If so, the MS can black list both the beacon (hopping) and the femtocell since the beacon will always force a redirection to the alien femtocell (block 644). This avoids both the beacon (hopping) and the alien femtocell to break system selection. Additional, if the mobile knows if the (provisioned as black listed) femtocell is using a beacon and additionally it also knows that it is a hopping beacon, the MS knows that it needs to avoid all the channels where the hopping beacon will be operating as it hopping beacon (block 646). The MS determines the channels where the MS is hopping based on the PUZL record indicating that the channels (block 648). This can also be used for white list entries in the PUZL to avoid OFS scans knowing that the MS will encounter the beacon on any one of the channels that it is operating on (block 650). By virtue of the foregoing, it should be appreciated that when using a PUZL-based methodology, the device thus may search for the actual femto cell or be provisioned with generic parameters sufficient to find the beacon of the femto cell that redirects the device to the actual femto cell channel of operation.

Figure 7:
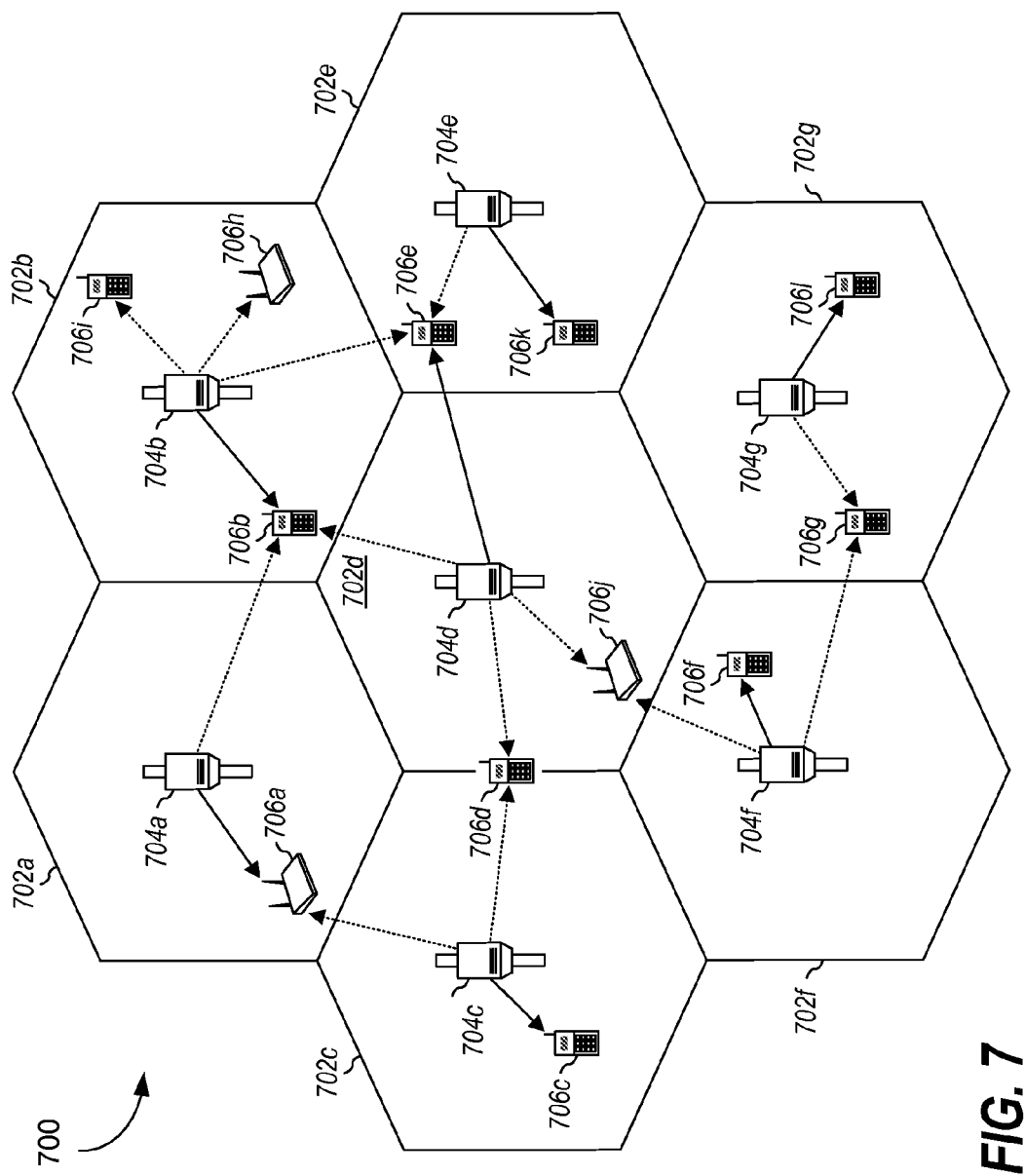
FIG. 7 illustrates an exemplary wireless communication system.

FIG. 7 illustrates an exemplary wireless communication system 700 configured to support a number of users, in which various disclosed embodiments and aspects may be implemented. As shown in FIG. 7, by way of example, system 700 provides communication for multiple cells 702, such as, for example, macro cells 702a-702g, with each cell being serviced by a corresponding access point (AP) 704 (such as APs 704a-104g), also known as access nodes (ANs). Each cell may be further divided into one or more sectors. Various access terminals (ATs) 706, including ATs 706a-706k, also known interchangeably as user equipment (UE), are dispersed throughout the system. Each AT 706 may communicate with one or more APs 704 on a forward link (FL) and/or a reverse link (RL) at a given moment, depending upon whether the AT is active and whether it is in soft handoff, for example. The wireless communication system 700 may provide service over a large geographic region, for example, macro cells 702a-702g may cover a few blocks in a neighborhood.

Figure 8:
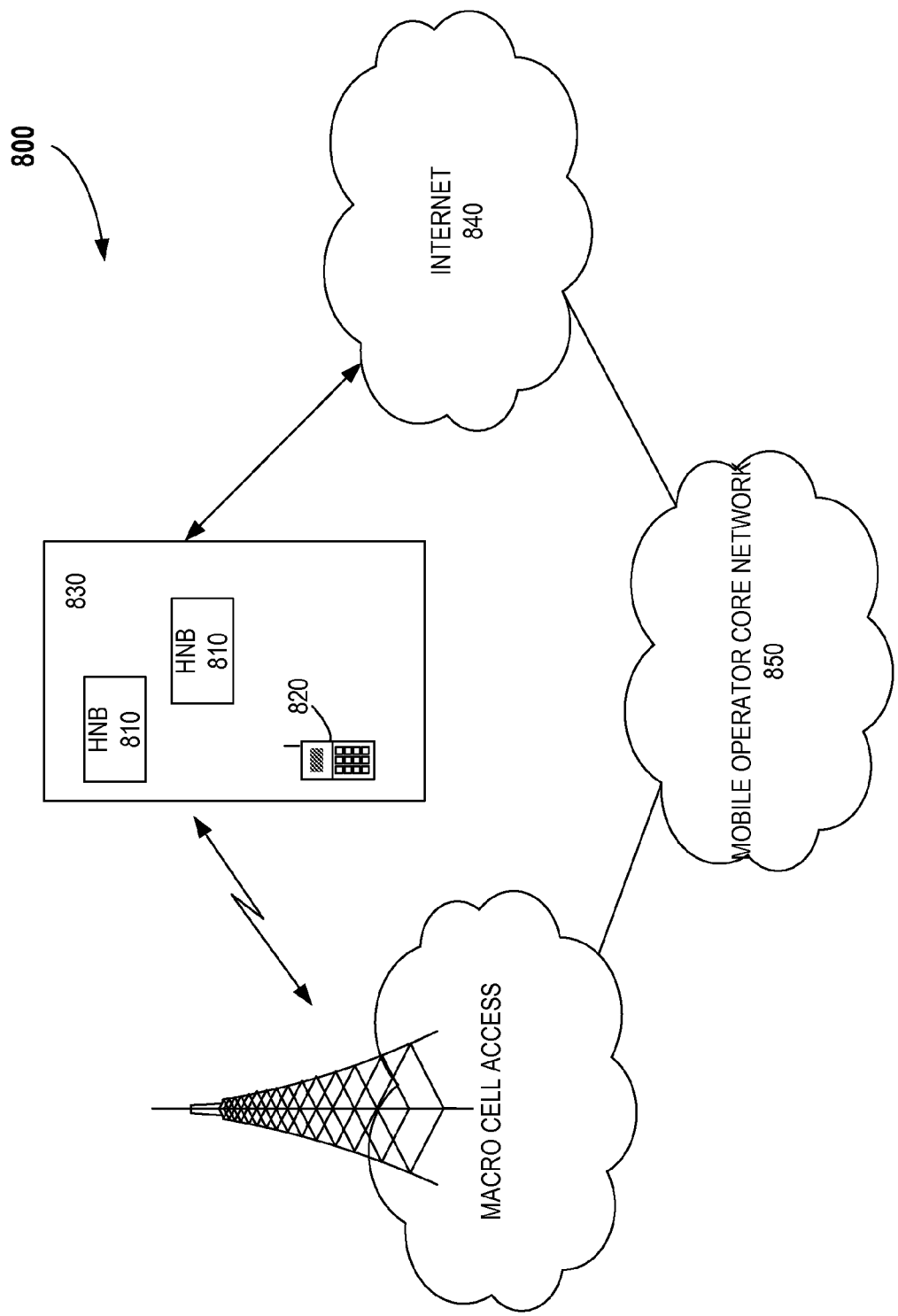
FIG. 8 illustrates an exemplary communication system to enable deployment of access point base stations within a network environment.

FIG. 8 illustrates an exemplary communication system to enable deployment of access point base stations within a network environment. As shown in FIG. 8, the system 800 includes multiple access point base stations or Home Node B units (HNBs), such as, for example, HNBs 810, each being installed in a corresponding small scale network environment, such as, for example, in one or more user residences 830, and being configured to serve associated, as well as alien, user equipment (UE) 820. Each HNB 810 is further coupled to the Internet 840 and a mobile operator core network 850 via a DSL router (not shown) or, alternatively, a cable modem (not shown), a wireless link, or other Internet connectivity means.

Although embodiments described herein use 3GPP terminology, it is to be understood that the embodiments may be applied to 3GPP (Rel99, Rel5, Rel6, Rel7) technology, as well as 3GPP2(1xRTT, 1xEV-DO Rel0, RevA, RevB) technology and other known and related technologies. In such embodiments described herein, the owner of the HNB 810 subscribes to mobile service, such as, for example, 3G mobile service, offered through the mobile operator core network 850, and the UE 820 is capable to operate both in macro cellular environment and in residential small scale network environment.

Figure 9:
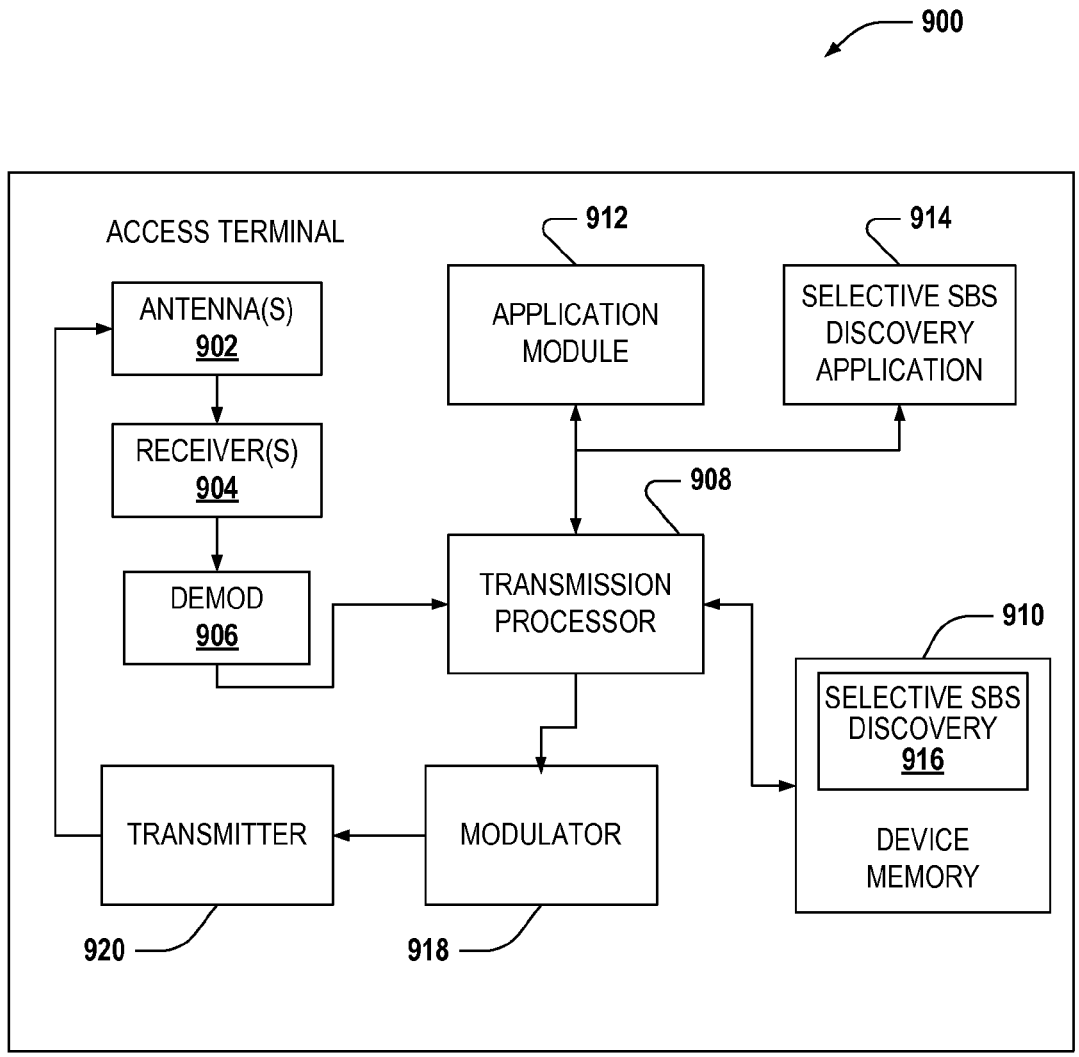
FIG. 9 illustrates a block diagram of a system comprising logical grouping of electrical components for selective small base station discovery.

FIG. 9 illustrates a sample mobile device that can interface with a femto base station (fBS) network for cellular access in accordance with one or more aspects. Mobile device 900 includes at least one antenna 902 (e.g., a transmission receiver or group of such receivers comprising an input interface) that receives a signal (e.g., containing information related to a data link between a first fBS and mobile device 900) and at least one receiver 904 that performs typical actions (e.g., filters, amplifies, down-converts, etc.) on the received signal. Specifically, antenna(s) 902 can receive information from one or more cellular base stations or fBSs (not depicted), as described herein, to participate in a communication link with such devices. For example, the antenna(s) 902 can receive identifying information such as geographic location from an fBS or a cellular network component.

Antenna 902 and receiver 904 can also be connected to a demodulator 906 that can demodulate received symbols and provide them to a transmission processor 908 for evaluation.

Transmission processor 908 can be a processor dedicated to analyzing information received by antenna(s) 902 and/or generating information for transmission by a transmitter 920. Additionally, transmission processor 908 can control one or more components of mobile device 900, and/or analyze information received by antenna(s) 902, generate information for transmission by transmitter 920, and control one or more components of mobile device 900. Additionally, transmission processor 908 can access an application module 912 stored in device memory 910 to execute instructions for determining a proximity trigger and scanning for a preferred small base station (e.g., femto base station). Mobile device 900 can additionally comprise device memory 910 that is operatively coupled to transmission processor 908 and that can store data to be transmitted, received, and the like. Furthermore, memory 910 can store application modules for mobile device 900. Selective SBS Discovery application module 912 and application 914 can be two such modules stored within device memory 910 (see below).

It will be appreciated that a data store (e.g., device memory 910) described herein can be either volatile memory or non-volatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory (e.g., device memory 910) of the subject systems and methods is intended to comprise, without being limited to, these and any other suitable types of memory.

Application module 912 can be stored in device memory 908 and configured to generate instructions for an fBS to report its geographic location or a beacon and to perform provisioning of a selective SDS discovery database. For instance, the application module 912 can access data store in memory 908 and identify an fBS affiliated with mobile device 900. Also stored in device memory 910 is a selective SBS discovery application 914. Mobile device 900 still further comprises a modulator 918 and a transmitter 920 that transmits a signal (e.g., including a transmission data packet) for instance, to a base station (e.g., fBS or group of fBSs), an access point, another mobile device, a remote agent, etc. Although depicted as being separate from the transmission processor 908, it is to be appreciated that application module 912 and transmission mapping application 914 can be part of processor 908 or a number of processors (not shown), stored in cache memory, for instance.

Figure 10:
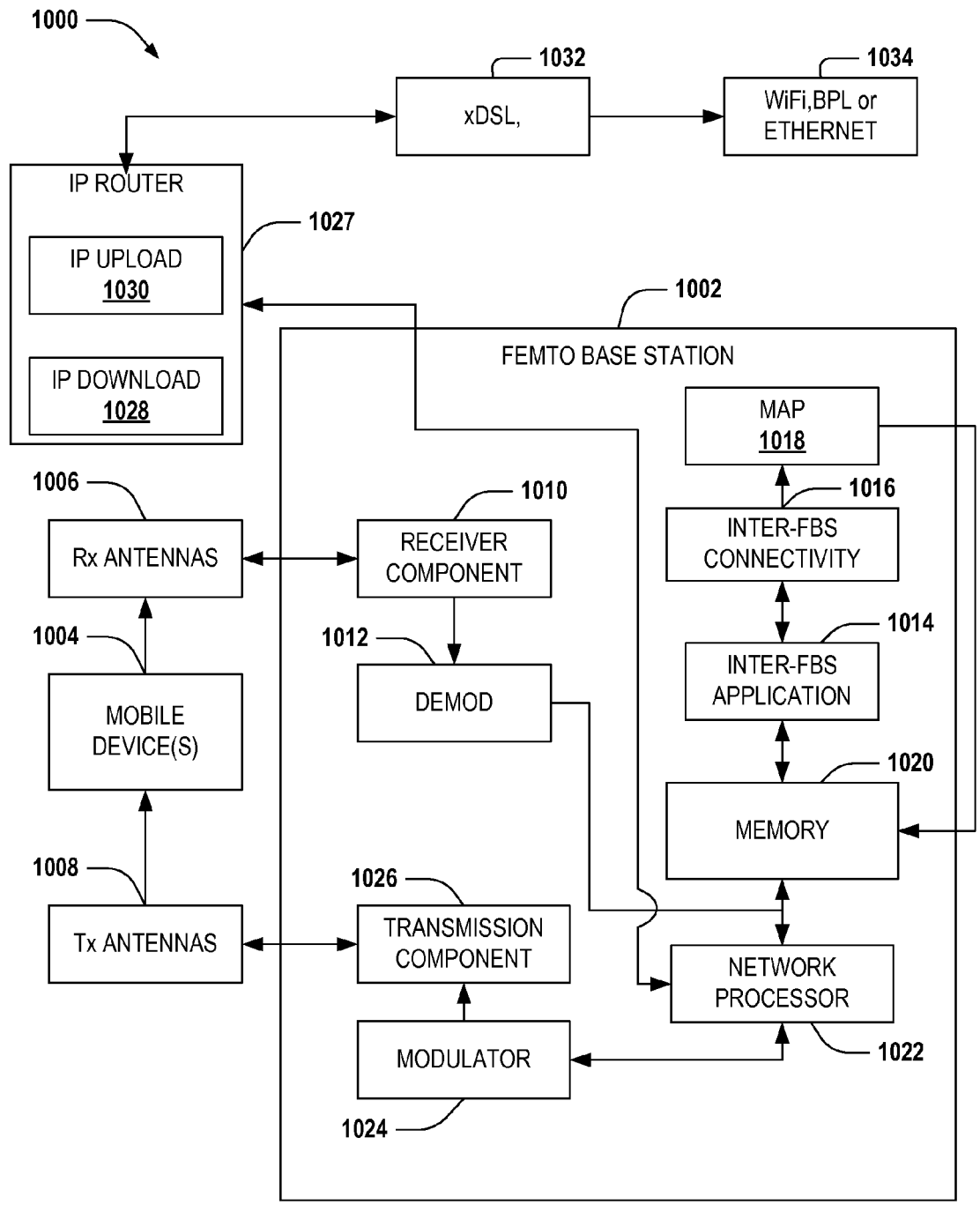
FIG. 10 illustrates a block diagram of a system comprising logical grouping of electrical components for selective small base station discovery.

FIG. 10 is an illustration of a system 1000 that can interface mobile devices 1004 with a cellular network (not depicted) by way of a network of fBS devices. System 1000 includes an fBS 1002 (e.g., access point . . . ) with a receiver component 1010 that receives signal(s) from mobile device(s) 1004, or from other fBS devices (not depicted) through a plurality of receive antennas 1006. fBS 1002 also includes a transmission component 1026 that transmits to the mobile device(s) 1004 (or other fBS devices) through one or more transmit antennas 1008. Receiver component 1010 can receive information from receive antennas 1006 and can further comprise a signal recipient (not shown) that receives uplink data transmitted by the mobile devices. It should be appreciated that receiver component 1010 and transmission component 1026 can both include WLAN, BPL, Ethernet, UMTS TDD, or WLAN over UMTS TDD spectra communication capabilities in order to interact with mobile devices or with other fBS devices.

Receiver component 1010 is operatively associated with a demodulator 1012 that demodulates received information. Demodulated symbols are analyzed by a network processor 1022 that can generate additional signals (e.g., in the form of transmission and/or routing instructions) modulated by modulator 1024 and transmitted by transmission component 1026. Further, network processor 1022 can be coupled to a memory 1020. Memory 1020 stores information pertinent to effectuating wired and/or wireless communication, application modules 1014, 1016 for maintaining an fBS network and routing information between fBS devices and/or with connected mobile devices, and/or any other suitable information related to performing the various actions and functions set forth herein (see below).

Network processor 1022 can route at least a portion of traffic associated with a communication link between fBS 1002 and a mobile device 1004 to a neighboring fBS (not depicted) for transfer to a cellular network (e.g., by way of a direct connection to the cellular network, or by way of the Internet). Furthermore, network processor 1022 is configured to direct traffic affiliated with the fBS 1002 (e.g., generated by a predetermined mobile device or group of mobile devices, for instance) directly to the cellular network by way of an IP upload link 1030 (e.g., DSL connection, such as ADSL, VDSL, HDSL etc., cable IP connection, BPL connection). In addition, data can be received from the cellular network via an IP download link 1028 (e.g., DSL, cable, BPL) and directed to a mobile device 1004 affiliated with the fBS 1002. In addition to the foregoing, receiver component 1010 and transmission component 1026 can receive and transmit, respectively, various information to/from a cellular network (e.g., via IP upload 1030 and/or IP download 1028) or to/from other fBS devices of the fBS network by way of an IP router 1027 that communicates over unlicensed frequencies or wired connections (e.g., WLAN router, LAN router, or the like).

Figure 11:
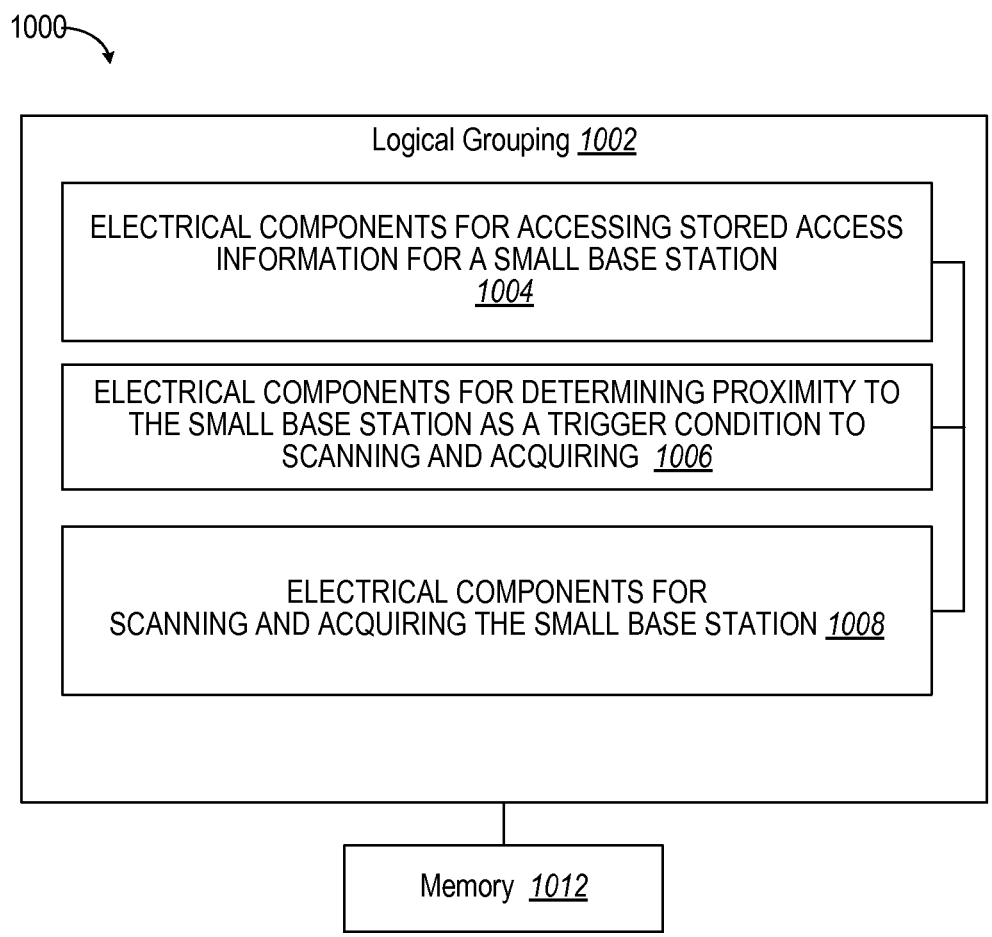
FIG. 11 illustrates a block diagram of a system having a logical grouping of electrical components for performing selective small base station discovery.

With reference to FIG. 11, illustrated is a system 1100 that enables scanning and acquiring femtocells. For example, system 1100 can reside at least partially within user equipment (UE). It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component for accessing stored access information for a small base station 1104. Moreover, logical grouping 1102 can include an electrical component for scanning and acquiring the small base station 1106. Further, logical grouping 1102 can include an electrical component for performing a medium access control (MAC) process in accordance with a protocol predefined for the scheduling conflict 1108. Additionally, system 1100 can include a memory 1112 that retains instructions for executing functions associated with electrical components 1104 and 1106. While shown as being external to memory 1112, it is to be understood that one or more of electrical components 1104, 1106 and 1108 can exist within memory 1112.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

The word "exemplary" is used herein to mean "serving as an example, instance, or illustration." Any embodiment described herein as "exemplary" is not necessarily to be construed as preferred or advantageous over other embodiments. The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Packet Access (HSPA, HSPA+), Time Division Multiple Access (TDMA) systems, Frequency Division Multiple Access (FDMA) systems, Orthogonal Frequency Division Multiple Access (OFDMA) systems, or other multiple access techniques. A wireless communication system may be designed to implement one or more standards, such as IS-95, cdma2000, IS-856, W-CDMA, TD-SCDMA, and other standards.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for discovering and acquiring a small base station, comprising:
   communicating, by a user equipment, with a macro network component including obtaining a macro network component identifier;
   accessing stored access information comprising one or more stored macro network component identifiers each corresponding to one or more small base station identifiers and associated small base station provisioning information for each small base station identifier, wherein each of the small base station provisioning information enables scanning and acquiring of a small base station corresponding to the small base station identifier;
   determining, by a processor, proximity to the small base station based on the macro network component identifier corresponding to one of the one or more stored macro network component identifiers, wherein the small base station is identified by at least a corresponding one of the one or more small base station identifiers
   restricting scanning for the small base station to scanning based on the provisioning information of the one or more small base station identifiers corresponding to the one or more stored macro network component identifiers corresponding to the macro network component identifier; and
   acquiring the small base station using the provisioning information of the one or more small base station identifiers corresponding to the one or more stored macro network component identifiers corresponding to the macro network component identifier.

2. The method of claim 1, wherein accessing the stored access information further comprises accessing the provisioning information for a femto system defined by the small base station.

3. The method of claim 1, further comprising determining proximity to the small base station by:
   determining a current location; and
   comparing the current location to stored location information for the small base station.

4. The method of claim 3, further comprising:
   predicting a future location at a future time;
   comparing the future location to the stored location information for the small base station; and
   scheduling a scan at the future time.

5. The method of claim 1, wherein the access information for each of the one or more small base station identifiers further comprises an associated small base station user zone defined as part of a Preferred User Zone List, and wherein determining proximity to the small base station further comprises identifying a small base station user zone corresponding to the macro network component identifier in the access information, wherein the identified small base station user zone corresponds to a respective small base station user zone associated with the small base station identifier of the small base station.

6. The method of claim 1, wherein determining proximity to the small base station further comprises determining existence of a geographic based trigger condition.

7. The method of claim 6, further comprising receiving geographic information from a macro base station, wherein the received geographic information defines the geographic based trigger condition.

8. The method of claim 6, further comprising determining global positioning system information, wherein the determined global positioning system information defines the geographic based trigger condition.

9. The method of claim 6, further comprising receiving geographic information from a small base station, wherein the received geographic information defines the geographic based trigger condition.

10. The method of claim 1, further comprising scanning for one of a plurality of small base stations in accordance with a locally stored preferred list of small base stations when lacking a current geographic information.

11. The method of claim 1, further comprising identifying the small base station by receiving geographic information broadcast by the small base station.

12. The method of claim 1, further comprising identifying the small base station reporting a displaced geographic location from a stored geographic location.

13. The method of claim 12, further comprising identifying the small base station by masking geographic information broadcast to a lower resolution.

14. The method of claim 1, further comprising detecting and breaking a service selection loop to an alien small base station comprising avoiding scanning for the alien small base station for a period of time.

15. The method of claim 14, further comprising black listing an alien femto system.

16. The method of claim 15, further comprising black listing a beacon that redirects to band class and channel of an alien femto system.

17. The method of claim 1, further comprising:
   determining an error rate exceeding a threshold for a detected small base station; and
   black listing the detected small base station.

18. The method of claim 1, further comprising receiving the stored access information from a network.

19. The method of claim 1, further comprising acquiring at least a portion of the stored access information by installation at a point of sale.

20. The method of claim 1, further comprising acquiring at least a portion of the stored access information via insertion of a computer-readable storage medium.

21. The method of claim 20, further comprising inserting a smart card to perform provisioning.

22. The method of claim 1, further comprising updating the stored access information by user input.

23. The method of claim 1, further comprising updating the stored access information from information learned from an encountered small base station.

24. The method of claim 1, further comprising:
   camping on the small base station; and
   providing a user indication for an access class for the small base station.

25. The method of claim 24, further comprising providing a user indication by displaying a graphical icon indicating a femto-cell.

26. The method of claim 24, further comprising providing a user indication for an access class representing a usage cost for the small base station currently camped on.

27. The method of claim 1, further comprising reducing a power usage of the user equipment by utilizing the processor to perform the proximity-triggered scanning and acquisition of the small base station.

28. The method of claim 1, wherein the macro network component identifier comprises at least one of a system identifier, a network identifier, a base station identifier, or a sector identifier.

29. At least one processor, associated with a user equipment, for discovering and acquiring a small base station, comprising:
   a first module for communicating with a macro network component including obtaining a macro network component identifier;
   a second module for accessing, at a user equipment (UE), stored access information comprising one or more stored macro network component identifiers each corresponding to one or more small base station identifiers and associated small base station provisioning information for each small base station identifier, wherein each of the small base station provisioning information enables scanning and acquiring of a small base station corresponding to the small base station identifier;
   a third module, comprising hardware, for determining proximity to the small base station based on the macro network component identifier corresponding to one of the one or more stored macro network component identifiers, wherein the small base station is identified by at least a corresponding one of the one or more small base station identifiers
   a fourth module for restricting scanning for the small base station to scanning based on the provisioning information of the one or more small base station identifiers corresponding to the one or more stored macro network component identifiers corresponding to the macro network component identifier; and
   a fifth module for acquiring the small base station using the provisioning information of the one or more small base station identifiers corresponding to the one or more stored macro network component identifiers corresponding to the macro network component identifier.

30. A non-transitory computer-readable medium storing computer-executable code, comprising:
   code for causing a computer to communicate with a macro network component including obtaining a macro network component identifier;
   code for causing the computer to access stored access information comprising one or more stored macro network component identifiers each corresponding to one or more small base station identifiers and associated small base station provisioning information for each small base station identifier, wherein each of the small base station provisioning information enables scanning and acquiring of a small base station corresponding to the small base station identifier;
   code for causing the computer to determine proximity to the small base station based on the macro network component identifier corresponding to one of the one or more stored macro network component identifiers, wherein the small base station is identified by at least a corresponding one of the one or more small base station identifiers; and
   code for causing the computer to restrict scanning for the small base station to scanning based on the provisioning information of the one or more small base station identifiers corresponding to the one or more stored macro network component identifiers corresponding to the macro network component identifier; and
   code for causing the computer to acquire the small base station using the provisioning information of the one or more small base station identifiers corresponding to the one or more stored macro network component identifiers corresponding to the macro network component identifier.

31. A user equipment apparatus for discovering and acquiring a small base station, comprising:
   means for communicating with a macro network component including obtaining a macro network component identifier;
   means for accessing stored access information comprising one or more stored macro network component identifiers each corresponding to one or more small base station identifiers and associated small base station provisioning information for each small base station identifier, wherein each of the small base station provisioning information enables scanning and acquiring of a small base station corresponding to the small base station identifier;
   means for determining proximity to the small base station based on the macro network component identifier corresponding to one of the one or more stored macro network component identifiers, wherein the small base station is identified by at least a corresponding one of the one or more small base station identifiers; and
   means for restricting scanning for the small base station to scanning based on the provisioning information of the one or more small base station identifiers corresponding to the one or more stored macro network component identifiers corresponding to the macro network component identifier; and
   means for acquiring the small base station using the provisioning information of the one or more small base station identifiers corresponding to the one or more stored macro network component identifiers corresponding to the macro network component identifier.

32. A user equipment apparatus for discovering and acquiring a small base station, comprising:
   a computing platform for:
      communicating with a macro network component including obtaining a macro network component identifier;
      accessing stored access information comprising one or more stored macro network component identifiers each corresponding to one or more small base station identifiers and associated small base station provisioning information for each small base station identifier, wherein each of the small base station provisioning information enables scanning and acquiring of a small base station corresponding to the small base station identifier
      determining proximity to the small base station based on the macro network component identifier corresponding to one of the one or more stored macro network component identifiers, wherein the small base station is identified by at least a corresponding one of the one or more small base station identifiers; and
      restricting scanning for the small base station to scanning based on the provisioning information of the one or more small base station identifiers corresponding to the one or more stored macro network component identifiers corresponding to the macro network component identifier; and
   a receiver for scanning and acquiring the small base station using the provisioning information of the one or more small base station identifiers corresponding to the one or more stored macro network component identifiers corresponding to the macro network component identifier.

33. The apparatus of claim 32, wherein the small base station further comprises a femto system.

34. The apparatus of claim 32, wherein the computing platform is further for determining proximity to the small base station by:
   determining a current location; and
   comparing the current location to stored location information for the small base station.

35. The apparatus of claim 34, wherein the computing platform is further for:
   predicting a future location at a future time;
   comparing the future location to the stored location information for the small base station; and
   scheduling a scan at the future time.

36. The apparatus of claim 32, wherein the access information for each of the one or more small base station identifiers further comprises an associated small base station user zone defined as part of a Preferred User Zone List, and wherein the computing platform is further for determining proximity to the small base station by identifying a small base station user zone corresponding to the macro network component identifier in the access information, wherein the identified small base station user zone corresponds to a respective small base station user zone associated with the small base station identifier of the small base station.

37. The apparatus of claim 32, wherein the computing platform is further for determining proximity to the small base station by determining existence of a geographic based trigger condition.

38. The apparatus of claim 37, wherein the geographic based trigger condition comprises geographic information received from a macro base station.

39. The apparatus of claim 37, wherein the computing platform is further for determining global positioning system information, wherein the geographic based trigger condition comprises the determined global positioning system information.

40. The apparatus of claim 37, wherein the geographic based trigger condition comprises geographic information received from a macro base station.

41. The apparatus of claim 40, wherein the computing platform is further for scanning for one of a plurality of small base stations in accordance with a locally stored preferred list of small base stations lacking a current geographic information.

42. The apparatus of claim 32, wherein the computing platform is further for identifying the small base station by receiving geographic information broadcast by the small base station.

43. The apparatus of claim 42, wherein the computing platform is further for identifying the small base station reporting a displaced geographic location from a stored geographic location.

44. The apparatus of claim 43, wherein the computing platform is further for identifying the small base station by masking geographic information broadcast to a lower resolution.

45. The apparatus of claim 32, wherein the computing platform is further for detecting and breaking a service selection loop to an alien small base station comprising avoiding scanning for the alien small base station for a period of time.

46. The apparatus of claim 45, wherein the computing platform is further for black listing an alien femto system.

47. The apparatus of claim 46, wherein the computing platform is further for black listing a beacon that redirects to band class and channel of an alien femto system.

48. The apparatus of claim 32, wherein the computing platform is further for:
   determining an error rate exceeding a threshold for a detected small base station; and
   black listing the detected small base station.

49. The apparatus of claim 32, wherein the computing platform is further for acquiring at least a portion of the stored access information from a network.

50. The apparatus of claim 32, wherein the computing platform is further for acquiring at least a portion of the stored access information by installation at a point of sale.

51. The apparatus of claim 32, wherein the computing platform is further for acquiring at least a portion of the stored access information via insertion of a computer-readable storage medium.

52. The apparatus of claim 51, wherein the computing platform is further for acquiring at least a portion of the access information from a smart card.

53. The apparatus of claim 32, wherein the computing platform is further for updating the stored access information by user input.

54. The apparatus of claim 32, wherein the computing platform is further for updating the stored access information from information learned from an encountered small base station.

55. The apparatus of claim 32, wherein the computing platform is further for:
   camping on the small base station; and
   providing a user indication for an access class for the small base station.

56. The apparatus of claim 55, further comprising a user interface for providing a user indication by displaying a graphical icon indicating a femto-cell.

57. The apparatus of claim 55, further comprising a user interface for providing a user indication for an access class representing a usage cost for the small base station currently camped on.

58. The apparatus of claim 32, wherein the computing platform is further for reducing power usage by utilizing a processor of the computer platform to perform the proximity-triggered scanning and acquisition of the small base station.

59. A method for discovering and acquiring a small base station, comprising:
   accessing stored access information for a small base station;
   determining proximity to the small base station as a trigger condition to scanning and acquiring;
   identifying the small base station by receiving geographic information broadcast by the small base station, by identifying that the small base station is reporting a displaced geographic location from a stored geographic location, and by masking the received geographic information to a lower resolution; and
   scanning and acquiring the small base station.

60. An apparatus for discovering and acquiring a small base station, comprising:
   a computing platform to access stored access information for a small base station, determine proximity to the small base station as a trigger condition to scanning and acquiring;
   wherein the computer platform is further configured to identify the small base station by receiving geographic information broadcast by the small base station, by identifying that the small base station is reporting a displaced geographic location from a stored geographic location, and by masking the received geographic information to a lower resolution; and
   a receiver to scan and acquire the small base station.

61. A method for discovering and acquiring a small base station, comprising:
- accessing, by a user equipment, stored access information for a small base station;
- determining proximity to the small base station as a trigger condition to scanning and acquiring;
- scanning and acquiring the small base station; and
- detecting and breaking a service selection loop to an alien small base station comprising avoiding scanning for the alien small base station for a period of time.

* * * * *